(12) United States Patent
Nishioka et al.

(10) Patent No.: US 7,488,193 B1
(45) Date of Patent: Feb. 10, 2009

(54) RCARD CONNECTOR

(75) Inventors: Toru Nishioka, Miyagi-ken (JP);
Kazuki Satoh, Miyagi-ken (JP); Toru Wagatsuma, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/134,694

(22) Filed: Jun. 6, 2008

(30) Foreign Application Priority Data

Jul. 18, 2007 (JP) .............................. 2007-187433

(51) Int. Cl.
*H01R 13/62* (2006.01)

(52) U.S. Cl. ...................................... 439/159; 439/630

(58) Field of Classification Search ......... 439/136–140, 439/159, 160, 377, 630–635
See application file for complete search history.

(56) References Cited

U.S. PATENT DOCUMENTS 6,908,321 B1 * 6/2005 Lai ............................. 439/140
7,108,558 B2 * 9/2006 Zhu et al. .................... 439/630
7,112,095 B2 * 9/2006 Shen et al. ................... 439/630
7,303,413 B1 * 12/2007 Lai et al. ..................... 439/152
7,377,814 B2 * 5/2008 Shen et al. ................... 439/630
2004/0266237 A1 * 12/2004 Kodera et al. ............... 439/159
2008/0132110 A1 * 6/2008 Lai et al. ..................... 439/489

FOREIGN PATENT DOCUMENTS

JP 2004-206963 7/2004

* cited by examiner

*Primary Examiner*—James Harvey
(74) *Attorney, Agent, or Firm*—Brinks Hofer Gilson & Lione

(57) ABSTRACT

Provided is a card connector including a first contact which is connected to a first card (card B), a second contact which is disposed toward an insertion port of the card from the first contact so as to be connected to a second card (card C), and a protection plate which protects the second contact from the contact with the first card. A guide piece which guides the bottom surface of the first card is formed in a housing in which the first and second cards are selectively mounted, and a support surface which is disposed in a position toward the insertion port and on the upper side from the guide piece is formed on the protection plate. The first card is inserted in a state where the leading end thereof is inclined more downward than the rear end thereof.

6 Claims, 36 Drawing Sheets

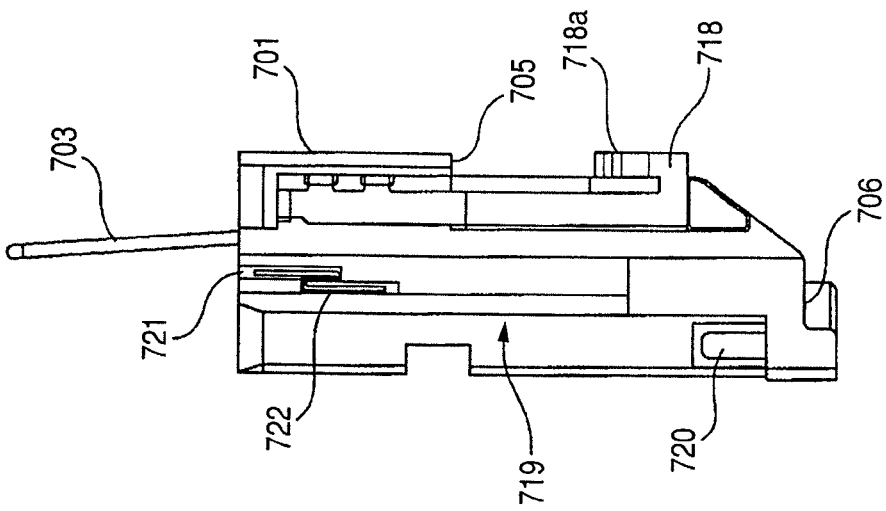
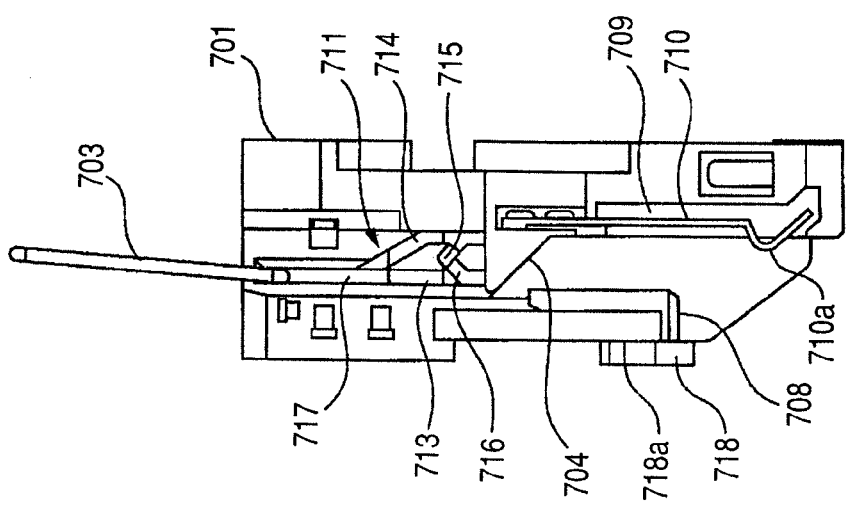

RCARD CONNECTOR

CROSS REFERENCE TO RELATED APPLICATIONS

The present application contains subject matter related to Japanese Patent Application JP2007-187433 filed in the Japanese Patent Office on Jul. 18, 2007, the entire contents of which being incorporated herein by reference.

BACKGROUND

1. Field of the Invention

The present invention relates to a card connector in which plural types of cards can be mounted.

2. Description of the Related Art

In the related art, a card connector has been proposed, which can selectively mount an SD card and a Memory Stick DUO™, of which the lengths are substantially the same and the widths and thicknesses are different from each other (for example, refer to Japanese Patent Application JP2004-206963). In this card connector, a partition plate of a sliding member is disposed between contacts corresponding to the cards such that one card is contacted with the contact corresponding to the upper side of the partition plate and the other card is contacted with the contact corresponding to the lower side of the partition plate.

In the card connector in the related art, however, when an xD-Picture™ card, which has a height and size, is applied, the Memory Stick DUO card comes in contact with a contact for the xD-Picture card. In particular, a conversion adapter for the Memory Stick DUO card uses a metal plate that is exposed to the surface of a housing. Therefore, when the metal plate comes in contact with the contact for the xD-Picture card, an external circuit may be short-circuited.

SUMMARY

According to an aspect of the invention, a car connector includes a housing having a card mounting space where at least first and second cards can be selectively mounted; an insertion port for the cards formed at one end of the housing; a first contact connected to a contact portion of the first card; a second contact disposed toward the insertion port from the first contact so as to be connected to a contact portion of the second card; and a protection plate protecting the second contact from the contact with the first card. A first bottom-surface guide portion guiding the bottom surface of the first card during the insertion of the first card is formed in the housing. A second bottom-surface guide portion, which is disposed in a position toward the insertion port and on the upper side from the first bottom-surface guide portion to guide the bottom surface of the first card during the insertion of the first card, is formed in the protection plate such that the first card is inserted in a state where the leading end of the first card is inclined more downward than the rear end thereof.

BRIEF DESCRIPTION OF THE DRAWINGS

FIGS. 18A and 18B are top and bottom views of the discharge mechanism of the connector according to this embodiment;

DESCRIPTION OF THE EMBODIMENTS

Preferred embodiments of the invention will now be described with reference to the drawings. A card connector (hereinafter, simply referred to as 'connector') according to an embodiment can selectively mount plural types of cards, while a reduction in height of the connector is achieved. The connector according to the embodiment is constructed in such a manner that five types of cards including a SD (Secure Digital) card, an MMC (Multi Media Card), a Memory Stick Duo (trademark) card, a Memory Stick PRO-HG Duo card, and an xD-Picture (trademark) card can be mounted therein.

The MMC card has almost the same shape as the SD card except that the thickness thereof is slightly smaller than the SD card. Therefore, the MMC card is mounted in the same manner in the connector according to this embodiment. Further, the Memory Stick Duo card and the Memory Stick PRO-HG Duo card have the same shape except the construction of a contact pad that comes in contact with the contacts. Therefore, the Memory Stick Duo card and the Memory Stick PRO-HG Duo card are mounted in the same manner in the connector according to this embodiment. In the following descriptions, the SD card and the MMC card are referred to as 'card A', the Memory Stick Duo card and the Memory Stick PRO-HG Duo card are referred to as 'card B', and the xD-Picture card is referred to as 'card C'.

Figure 1:
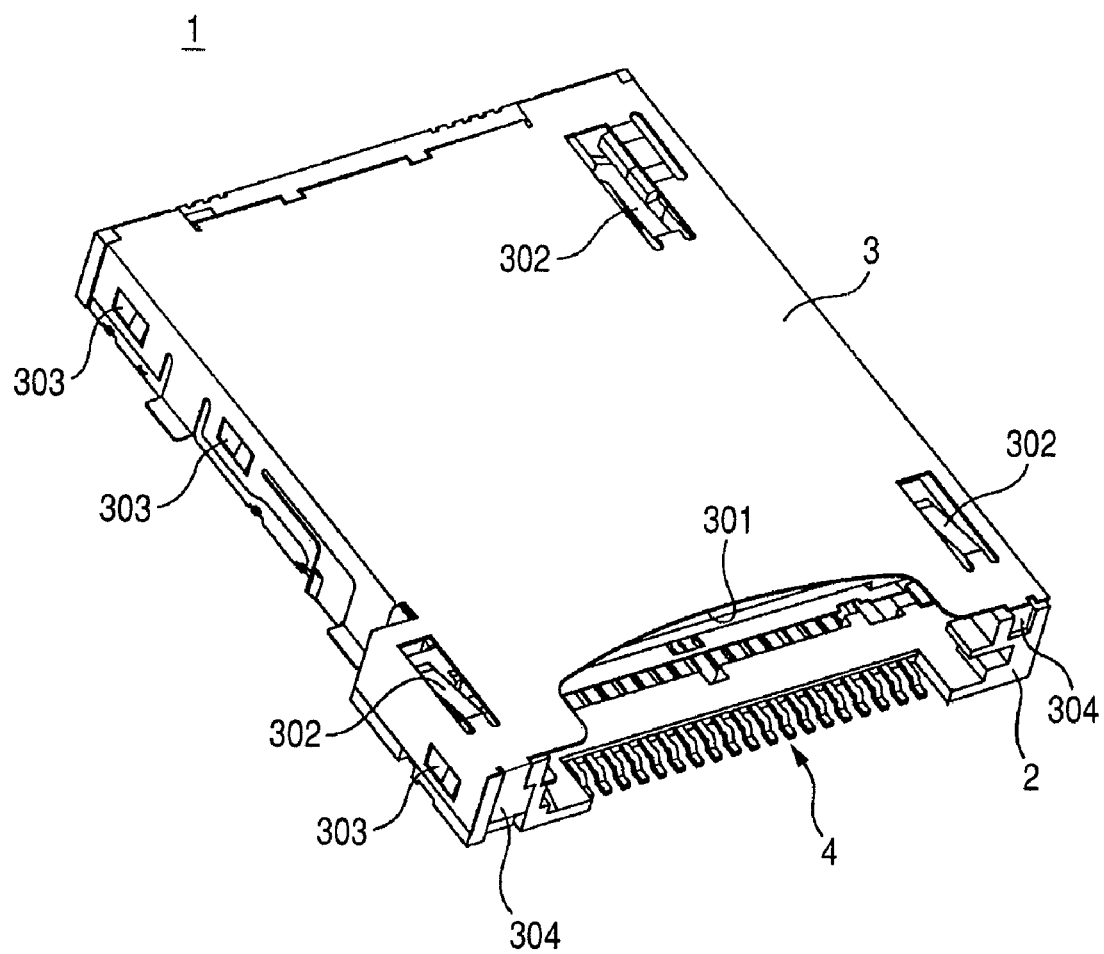
FIG. 1 is a perspective view of a connector according to an embodiment.

FIG. 1 is a perspective view of the connector 1 according to the embodiment. In the following descriptions, the lower side of FIG. 1 is referred to as 'front side of connector 1' or simply referred to as 'front side', and the upper side of FIG. 1 is referred to as 'rear side of connector 1' or simply referred to as 'rear side'. Further, the right side of FIG. 1 is referred to as 'right side of connector 1' or simply referred to as 'right side', and the left side of FIG. 1 is referred to as 'left side of connector 1' or simply referred to as 'left side'.

As shown in FIG. 1, the connector 1 according to this embodiment includes a housing 2 formed by molding an insulating material such as synthetic resin and a cover member 3 formed by performing a punching process and a bending process on a metallic thin plate. The housing 2 is formed in a flat rectangular parallelepiped shape as a whole and has a space of which the upper and front sides are opened. The cover member 3 has a shape corresponding to the upper opening portion of the housing 2 and covers the upper side of the housing 2. As the housing 2 and the cover member 3 are assembled into each other, the connector 1 has a shape of which only the front side is opened, and an insertion port 4 is constructed in the opening portion. Further, the cover member 3 may be formed by molding an insulating material such as synthetic resin.

The cover member 3 has a notch portion 301 formed in the central portion thereof at the front side such that a card mounted through the card insertion port 4 can be easily pulled out. Further, the cover member 3 has a plurality of biasing pieces 302 formed on the top surface thereof. The biasing pieces 302 are slightly bent downward so as to bias a partition plate 6 disposed inside the connector 1 and a locking member 703 of a sliding member 701 from the upper side. Further, the cover member 3 has a plurality of opening portions 303 formed on the side surface thereof, the opening portions 303 are engaged with engagement pieces 203 of the housing 2, which will be described below. Further, the cover member 3 has a pair of engagement pieces 304 formed on the front side thereof, the engagement pieces 304 being engaged with concave portions 205 of the housing 2, which will be described below. The cover member 3 is fixed to the housing 2 by engaging the engagement pieces 304 with the concave portions 205 of the housing 2 and engaging the engagement pieces 203 of the housing 2 with the plurality of openings 303.

Figure 2:
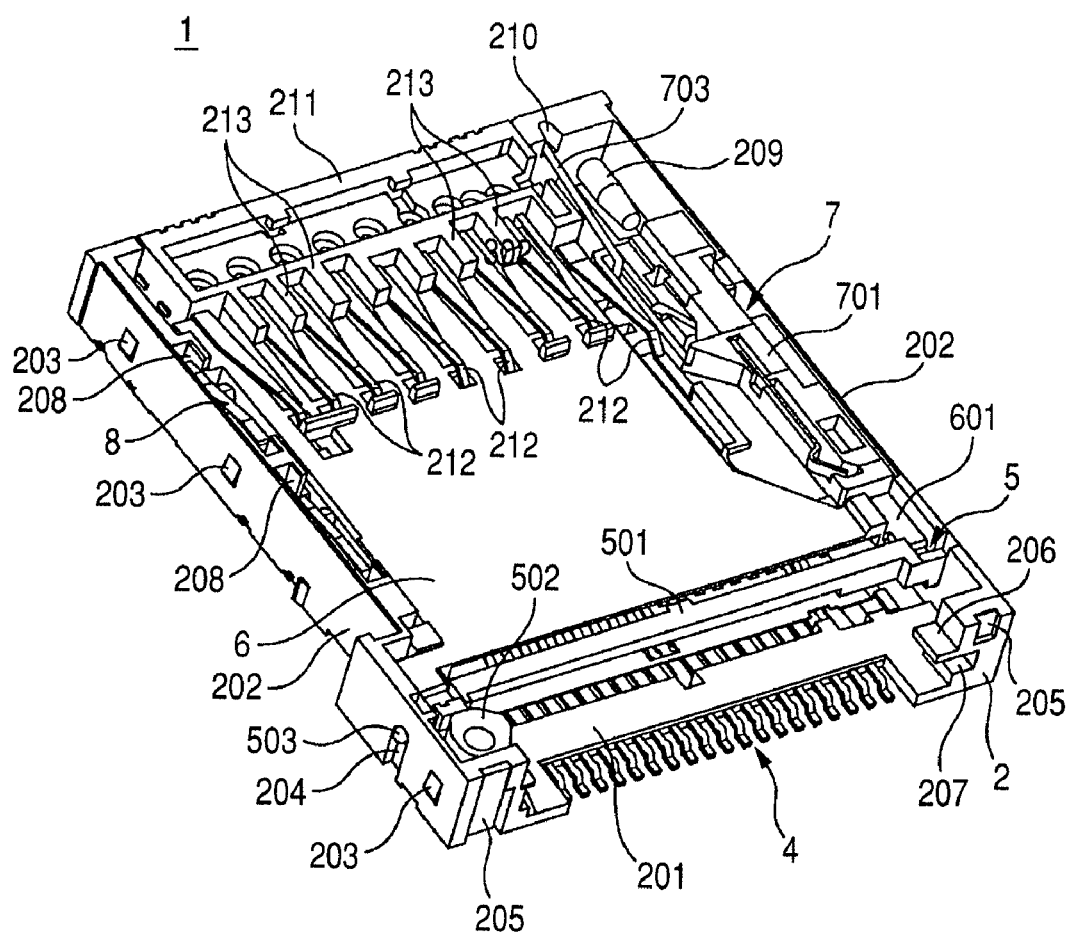
FIG. 2 is a perspective view for explaining the internal construction of the connector according to this embodiment.
Figure 3:
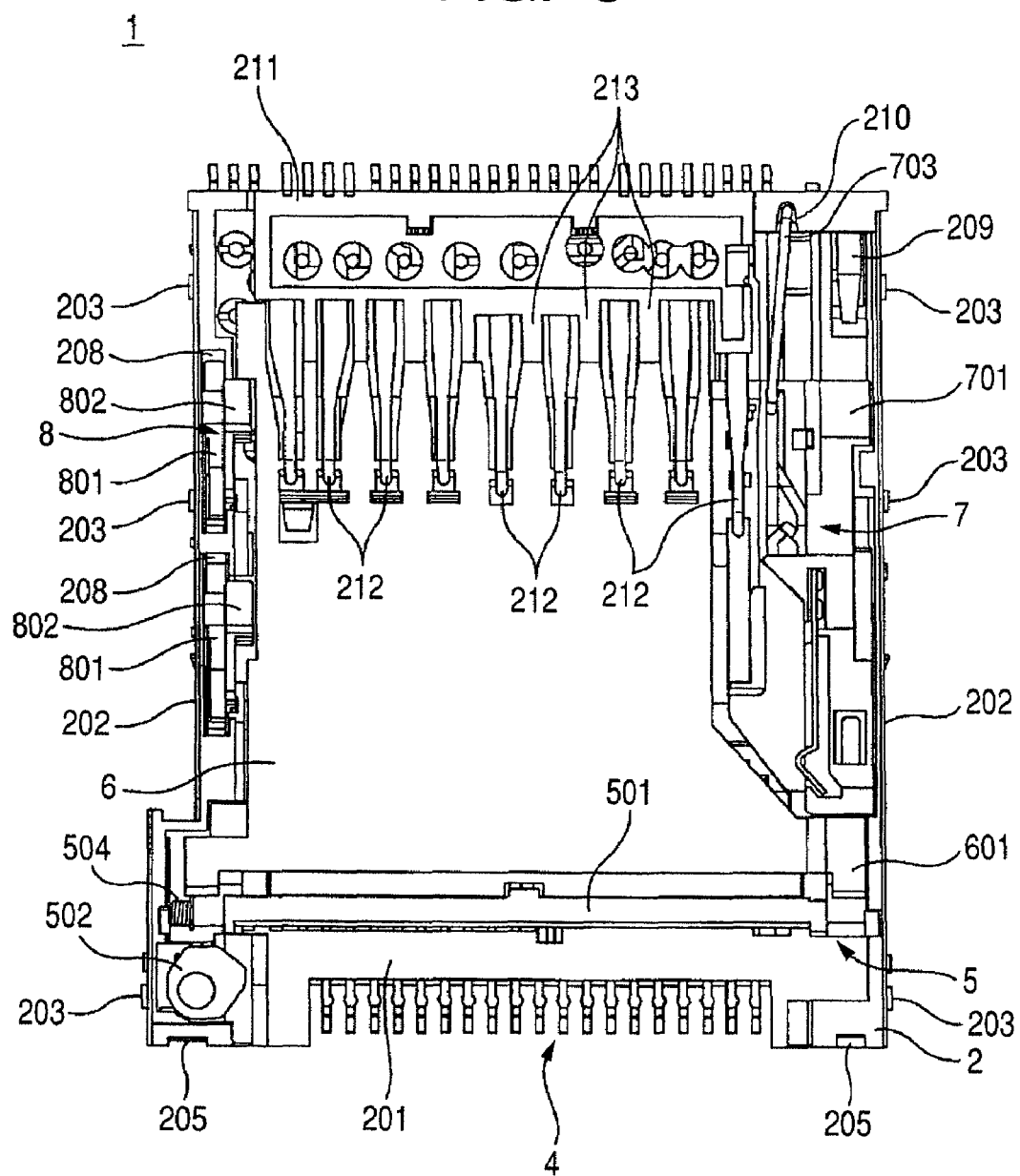
FIG. 3 is a top view for explaining the internal construction of the connector according to this embodiment.
Figure 4:
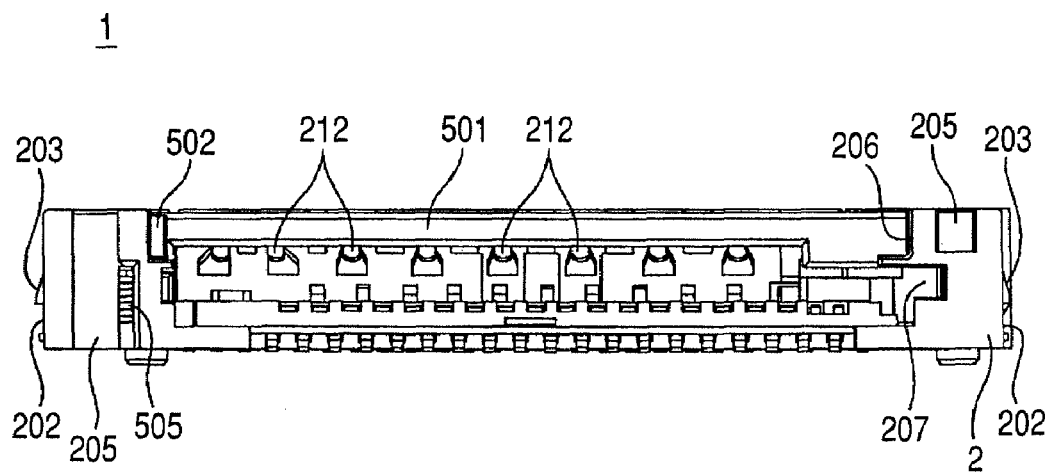
FIG. 4 is a front view of the connector shown in FIGS. 2 and 3.

Hereinafter, the internal construction of the connector 1 according to this embodiment will be described. FIG. 2 is a perspective view for explaining the internal construction of the connector 1 according to this embodiment. FIG. 3 is a top view for explaining the internal construction of the connector 1 according to this embodiment. FIG. 4 is a front view of the connector 1 shown in FIGS. 2 and 3. FIGS. 2 to 4 show a case where the cover member 3 is removed from the connector 1 shown in FIG. 1.

As shown in FIG. 2, the housing 2 has a predetermined space formed therein. In the space, a card mounting space in which plural types of cards can be mounted is constructed. In the space, there are provided contacts corresponding to plural types of cards, a shutter mechanism 5 which shields an insertion path of the cards in the card mounting space, a partition plate 6 which partitions the card mounting space, a discharge mechanism 7 which discharges plural types of cards, and a detection mechanism 8 which detects whether a specific card is mounted or not.

In the space within the housing 2, the shutter mechanism 5 is disposed in a slightly inner position (rear side) from the card insertion port 4. Further, the partition plate 6 is disposed in a further inner position (rear side) from the shutter mechanism 5. Further, the discharge mechanism 7 is disposed in a right-side position from the partition plate 6, and a portion of the detection mechanism 8 is disposed in a left-side position from the partition plate 6. Further, a portion of the detection mechanism 8 is also disposed in a lower-side position from the discharge mechanism 7, as will be described below in detail. The contacts corresponding to plural types of cards are properly disposed on the insertion path of a card from the card insertion port 4.

The housing 2 has a base portion 201 composing the bottom surface of the connector 1 and a side wall portion 202 which is vertically erected from the base portion 201 at the side end of the connector 1. In the base portion 201, the contacts corresponding to plural types of cards are provided, and a construction for protecting the contacts is formed, as will be described below in detail.

On the outer surface of the side wall portion 202, the plurality of engagement pieces 203 are formed, which are engaged with the opening portions 303 of the cover member 3. Further, a hole 204 for supporting a shaft 503 of the shutter mechanism 5, which will be described below, is formed in a front-side position of the connector 1. Further, the concave portions 205 for housing the engagement pieces 304 of the cover member 3 is formed on the front surface portion of the side wall portion 202. The inner surface of the front surface portion of the side wall portion 202 defines a portion of the card insertion port 4 and is mainly composed of a first guide portion 206 which guides the insertion of the card A and a second guide portion 207 which guides the insertion of the card C.

As shown in FIG. 4, the first guide portion 206 is formed on the upper end side of the side wall portion 202. When the card A is inserted, the first guide portion 206 guides the side and bottom surfaces of the card A. Further, a portion of the first guide portion 206 abuts on the left side surface of the card B and serves to guide the insertion of the card B. Meanwhile, the second guide portion 207 is formed on the lower side from the first guide portion 206. When the card C is inserted, the second guide portion 207 guides the top, side, and bottom surfaces of the card C.

The left side wall portion 202 is formed in a shape of which a front-side portion projects in the left side. In the inner space of the projecting portion, portions of the shutter mechanism 5 and the partition plate 6 are housed. Further, the left side wall portion 202 has two housing portions 208 formed therein, in which the detection mechanism 8 for detecting the insertion of the card A and the state of a writing prevention function is housed. The housing portions 208 are disposed in parallel along the insertion direction of the card in the connector 1 and house the detection mechanism 8 in a state where a portion of the detection mechanism 8 is exposed to the inside.

On the inner surface of the rear surface portion of the right side wall portion 202, a holding piece 209 is formed, which holds one end of a compression spring composing a portion of the discharge mechanism 7. In FIGS. 2 and 3, the compression spring is omitted. The holding piece 209 has a cylindrical shape as a whole and extends by a predetermined length toward the front side of the connector 1. Further, a locking hole 210 which locks one end of the locking member 703 composing a portion of the discharge mechanism 7 is formed in the rear surface portion. The locking hole 210 is constructed in such a manner that one end of the locking member 703 is inserted from the upper side.

At the rear end of the base portion 201, a contact unit 211 composing the rear wall portion of the housing 2 is disposed. The contact unit 211 is bonded and fixed to the base portion 201. On the front surface of the contact unit 211, a plurality of contacts 212 for the card A (hereinafter, referred to as 'contacts for card A') are provided so as to be aligned in the left and right direction of the connector 1.

The base ends of the contacts 212 for the card A are fixed to the main body of the contact unit, and the leading ends thereof extend slightly upward on the front side of the connector 1 and can swing upward and downward in a predetermined range. The rightmost contact 212 for the card A is disposed so as to slightly project toward the front side. The leading ends of the contacts 212 for the card A are bend downward, and are constructed so as to come in contact with a contact pad of the card A in the vicinity of the bent portions. As will be described below in detail, the leading ends of the contacts 212 for the card A (excluding the rightmost contact) are disposed in positions where they are housed in opening portions 603 formed in the partition plate 6. Further, one ends of the contacts 212 for the card A are led out from the rear side of the contact unit 211 to the outside of the connector 1 such that signals can be input to and output from the card A.

On the upper side of the front surface of the contact unit 211, a plurality of projecting pieces 213 projecting to the front side of the connector 1 are provided. The projecting pieces 213 are provided on the upper side of the contacts 212 for the card A where the contacts 212 for the card A are not present. The projecting pieces 213 serve to restrict the partition plate 6 from moving upward from a predetermined position at the rear end of the partition plate 6.

The shutter mechanism 5 includes a shutter member 501 and an actuator member 502. The shutter member 501 extends across the entire region of the connector 1 in the side-to-side direction of the connector 1. As shown in FIG. 4, the shutter member 501 is disposed so as to face the upper-side region of the card insertion port 4. Further, the shutter member 501 composes a card guide member. The shutter member 501 has a shaft 503 formed therein, the shaft 503 extending to the side direction of the connector 1. As the shaft 503 is inserted into the hole 204 of the housing 2, the shutter member 501 is rotatably supported by the housing 2. With the shaft 503 being set to a rotation supporting point, the shutter member 501 rotates in such a manner that the upper portion thereof falls down toward the rear side of the connector 1. Then, the insertion path of the card A is opened. The shaft 503 disposed in the left side has a coil spring 504 attached thereto, the coil spring 504 applying a biasing force which restores the shutter member 501 to the original position shown in FIGS. 2 to 4. The shutter member 501 is constructed so as to rotate against the biasing force of the coil spring 504, as the card A is inserted.

The actuator member 502 is disposed toward the card insertion port 4 (front side) from the shutter member 501. The actuator member 502 is disposed in such a state that a portion of the side surface thereof projects into the insertion path of the card A. The portion of the side surface of the actuator member 502, which projects into the insertion path of the card A, abuts on the card A, and the actuator member 502 is constructed so as to rotate toward the rear side of the connector 1. When the actuator member 502 rotates toward the rear side of the connector 1, the actuator member 502 retreats from the insertion path of the card A. The rotating shaft of the actuator member 502 has a coil spring 505 attached thereto (refer to FIG. 4), the coil spring 505 applying a biasing force which restores the actuator member 502 to the original position shown in FIGS. 2 to 4. The actuator member 502 is constructed so as to rotate against the biasing force of the coil spring 505, as the card A is inserted.

The partition plate 6 is constructed so as to slightly swing upward and downward into the card mounting space, depending on the type of a card inserted into the connector 1. The partition plate 6 has a plane shape as a whole and has a length corresponding to a distance from the vicinity of the rear side of the shutter mechanism 5 to the lower-side region of the projecting piece 213 of the contact unit 211. The partition plate 6 has an arm portion 601 formed at the front end thereof, the arm portion 601 being formed in a shape which spreads in the side direction of the connector 1 and having a length corresponding to the entire region of the inner space of the housing 2 in the side-to-side direction. On the top surface of the arm portion 601, the biasing pieces 302 of the cover member 3 are loaded in such a state that the partition plate 6 is slightly biased toward the lower side.

The discharge mechanism 7 includes the sliding member 701, a compression spring (not shown) 702, and the locking member 703. The sliding member 701 has a rectangular parallelepiped shape which extends in the front and rear direction of the connector 1 and is constructed so as to slide in the front and rear direction along the right side wall portion 202 of the housing 2. As will be described below in detail, the discharge mechanism 7 serves to move a card from a predetermined mounting position in the connector 1 to a discharge position, when a user performs a pressing operation on the card.

As described above, the rear end of the compression spring 702 is held by the holding piece 209 of the housing 2, and the front end thereof is held by a holding piece (not shown) provided on the bottom surface of the sliding member 701 such that a biasing force for biasing the sliding member 701 toward the front side is applied. The locking member 703 has a shape of which the front and rear ends are bent downward. As described above, a rear-side end of the locking member 703 is inserted into the locking hole 210 of the housing 2 such that a front-side end thereof is engaged with a guide groove 711 formed on the top surface of the sliding member 701. The locking member 703 serves to restrict the sliding member 701 from moving toward the front side, against the biasing force of the compression spring 702. On the locking member 703, the biasing piece 302 of the cover member 3 is loaded in such a manner that the locking member 703 is slightly biased downward so as to be engaged with the guide groove 711.

The detection mechanism 8 includes a plate-shaped portion 801, an abutting portion 802, and a contact portion (not shown) 803. The plate-shaped portion 801 is housed in the housing portion 208 of the housing 2. The abutting portion 802 is provided on the inner surface of the plate-shaped portion 801 in such a state that a portion thereof is exposed to the insertion path of the card A. As will be described below in detail, the contact portion 803 includes a fixed contact portion 803*a* disposed on the lower side of the plate-shaped portion 801 and a movable contact portion 803*b* which is swingably fixed to the bottom surface portion of the plate-shaped portion 801. The movable contact portion 803*b* is constructed of a torsion spring. Depending on whether the card A is inserted or not, the abutting portion 802 is displaced to change the angle of the plate-shaped portion 801 such that the conduction state and the non-conduction state between the movable contact portion 803*b* and the fixed contact portion 803*a* are switched.

Figure 5:
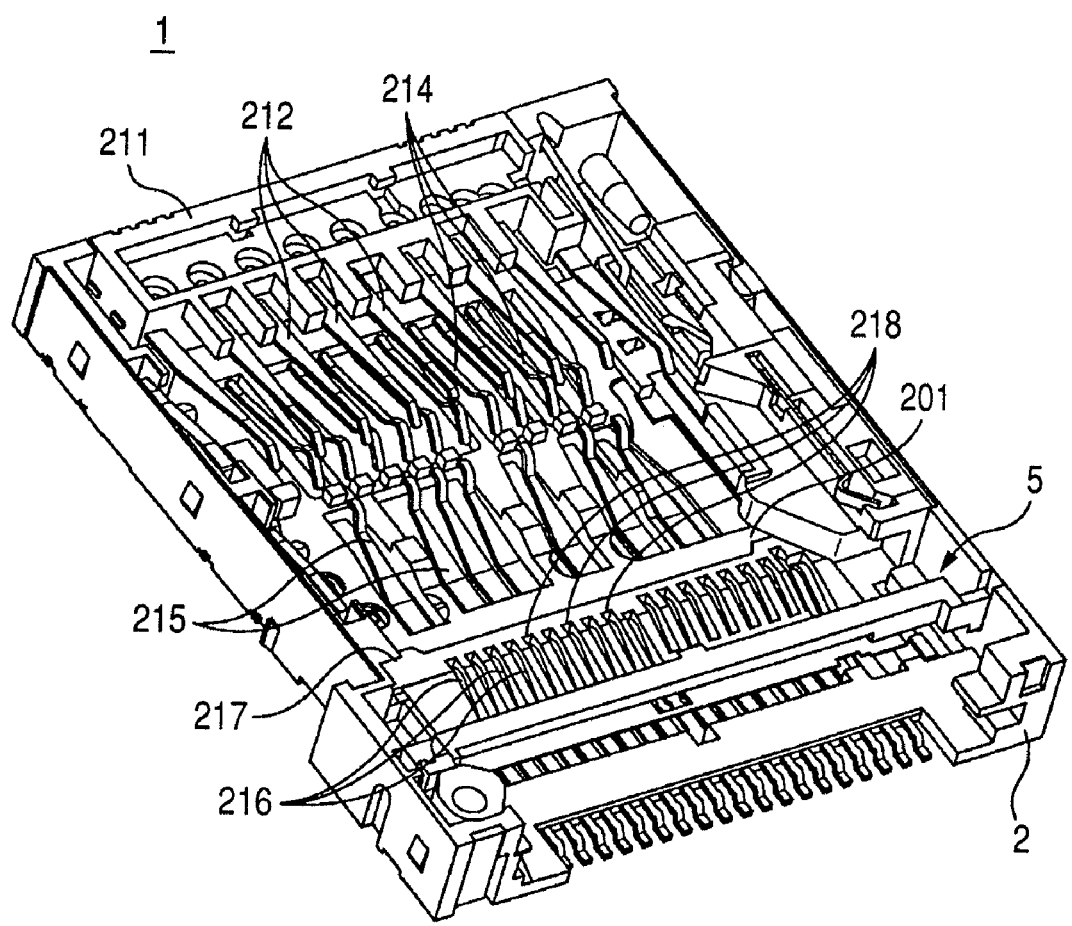
FIG. 5 is a perspective view for explaining the internal construction of the connector according to this embodiment.
Figure 6:
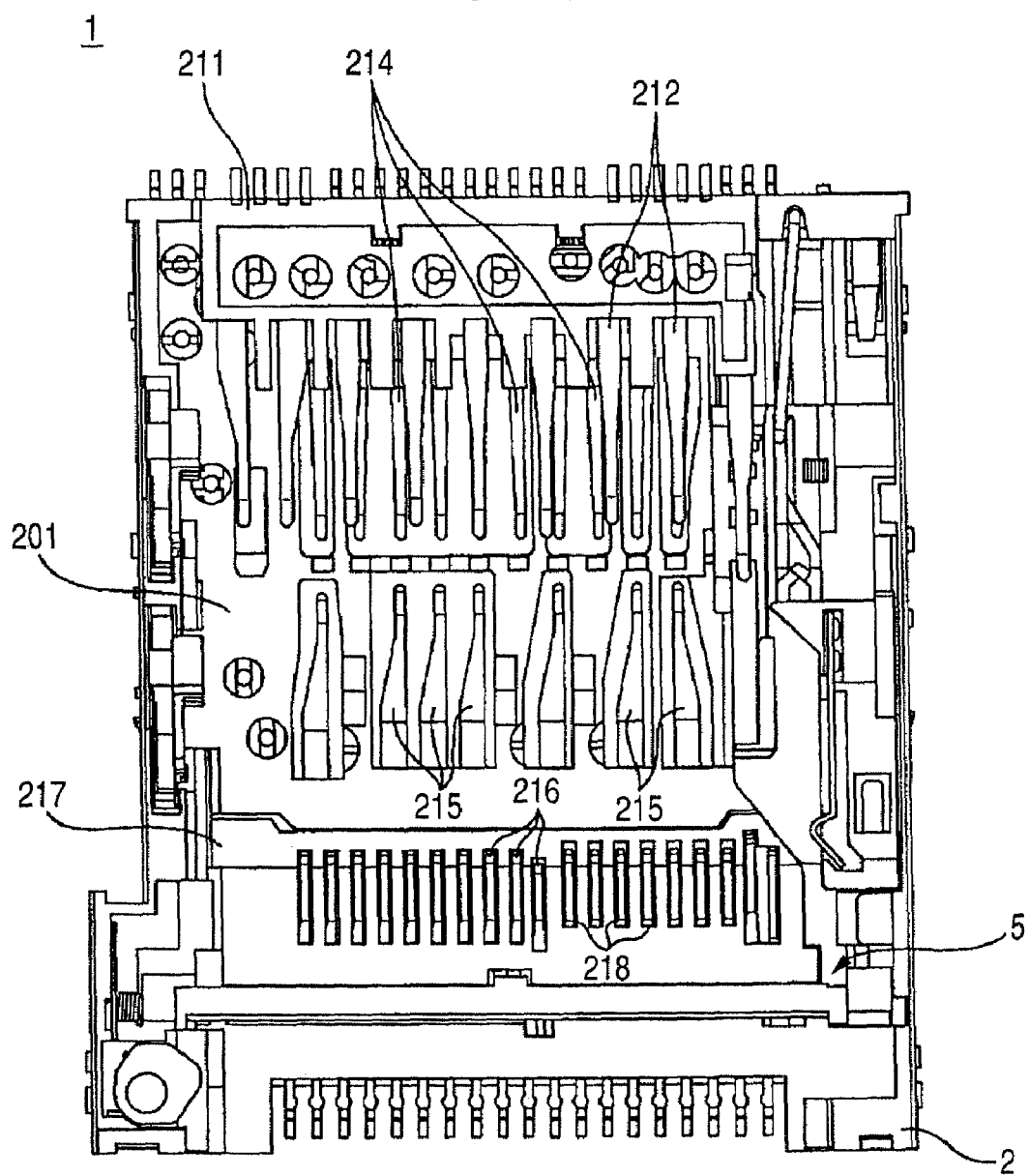
FIG. 6 is a top view for explaining the internal construction of the connector according to this embodiment.

FIG. 5 is a perspective view for explaining the internal construction of the connector 1 according to this embodiment. FIG. 6 is a top view for explaining the internal construction of the connector 1 according to this embodiment. FIGS. 5 and 6 show a case where the partition plate 6 is removed from the connector 1 shown in FIG. 2.

As shown in FIG. 5, a plurality of contacts 214 and 215 for the card B (hereinafter, referred to as 'contacts for card B') are provided in the vicinities of the center of the base portion 201 of the housing 2 so as to be aligned in the side-to-side direction of the connector 1. The contacts 214 for the card B are provided on the lower side of the contacts 212 for the card A. The base ends of the contacts 214 for the card B are fixed to the base portion 201, and the leading ends thereof extend slightly upward on the front side of the connector 1 so as to swing upward and downward in a predetermined range. Similar to the contacts 212 for the card A, the leading ends of the contacts 214 for the card B are bent downward in such a manner that the vicinities of the bent portions come in contact with a contact pad of the card B.

As such, the contacts 212 for the card A and the contacts 214 for the card B are provided at two stages in the card mounting space such that some of the contacts 212 and 214 overlap each other, as shown in FIG. 6. Therefore, the limited card mounting space within the connector 1 is effectively utilized.

Meanwhile, the contacts 215 for the card B are provided in front-side positions from the contacts 214 for the card B. The base ends of the contacts 215 for the card B are fixed to the base portion 201, and the leading ends thereof extend slightly upward on the rear side of the connector 1 so as to swing upward and downward in a predetermined range. Similar to the contacts 212 for the card A, the leading ends of the contacts 215 for the card B are bent downward in such a manner that the vicinities of the bent portions come in contact with the contact pad of the card B. Further, one ends of the contacts 214 and 215 for the card B are led out from the rear side of the base portion 201 to the outside of the connector 1 such that signals can be input to and output from the card B.

The contacts 214 for the card B are contacts corresponding to the Memory Stick Duo card, and the contacts 215 for the card B are contacts corresponding to the Memory Stick PRO-HG Duo card. The Memory Stick PRO-HG Duo card has a contact pad with the contacts, which is partially divided, different from the Memory Stick Duo card. In the connector 1 according to this embodiment, the contacts 215 for the card B are separately provided.

In the base portion 201 of the housing 2, a plurality of contacts 216 for the card C (hereinafter, referred to as 'contacts for card C') are provided so as to be aligned in the side-to-side direction of the connector 1. The contacts 216 for the card C are provided in slightly rear positions from the shutter mechanism 5 on the front side of the contacts 215 for the card B. The base ends of the contacts 216 for the card C are fixed to the base portion 201, and the leading ends thereof extend slightly upward on the rear side of the connector 1 so as to swing upward and downward within a predetermined range. Similar to the contacts 212 for the card A, the leading ends of the contacts 216 for the card C are bent downward in such a manner that the vicinities of the bent portions come in contact with a contact pad of the card C. Further, one ends of the contacts 216 for the card C are led out from the front side of the base portion 201 to the outside of the connector 1 such that signals can be input to and output from the card C.

In the vicinity of the contacts 216 for the card C, a protection plate 217 for protecting the contacts 216 for the card C is disposed. The protection plate 217 is constructed of a rectangular plate-shaped member, which extends in the side-to-side direction of the connector 1. The front end of the protection plate 217 is held by the base portion 201. Further, the protection plate 217 is pushed up by a support piece disposed on the lower side such that the leading end thereof in the rear side can slightly swing upward and downward, as the card C is inserted. The protection plate 217 has a plurality of groove portions 218 in which the plurality of contacts 216 for the card C are housed. When the card C is not inserted, the contacts 216 for the card C are protected by housing the contacts 216 for the card C in the respective groove portions 218.

Figure 7:
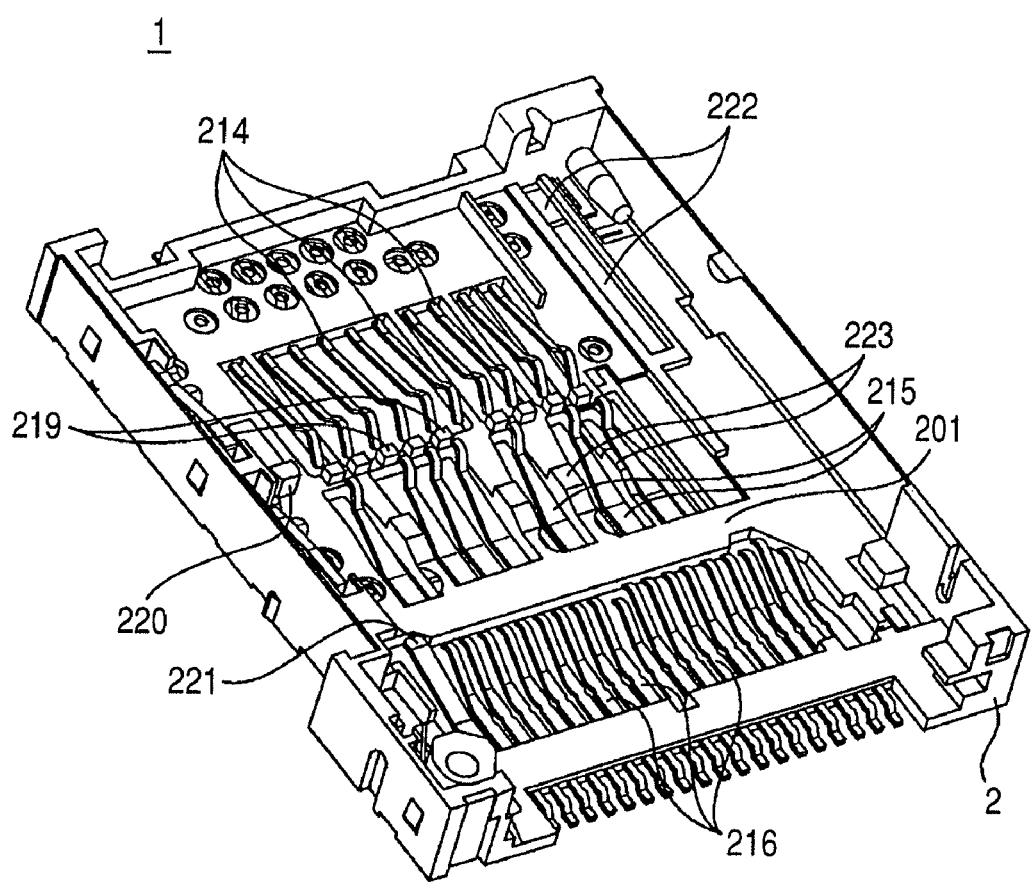
FIG. 7 is a perspective view for explaining the internal construction of the connector according to this embodiment.
Figure 8:
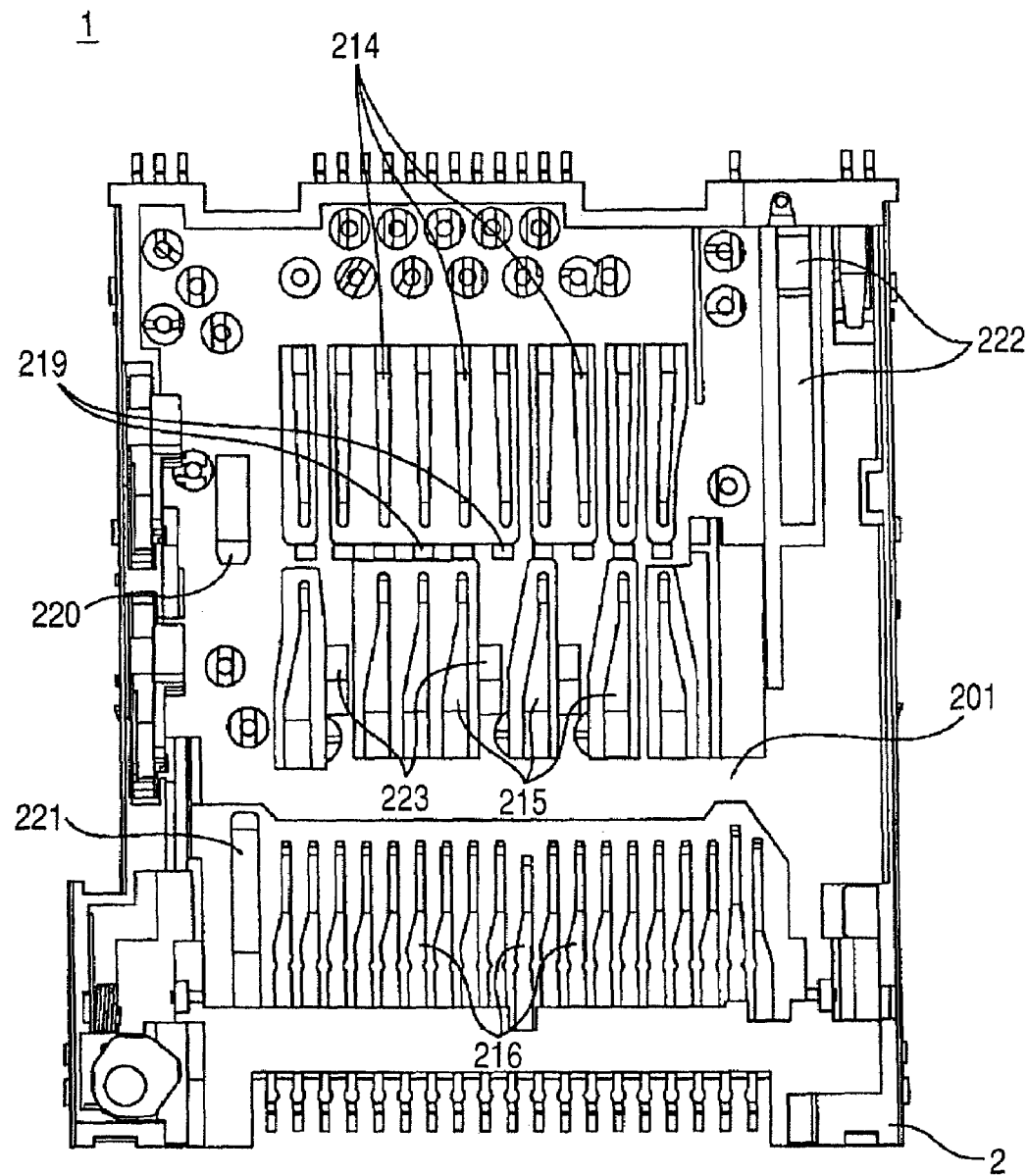
FIG. 8 is a top view for explaining the internal construction of the connector according to this embodiment.

FIG. 7 is a perspective view for explaining the internal construction of the connector 1 according to this embodiment. FIG. 8 is a top view for explaining the internal construction of the connector 1 according to this embodiment. FIGS. 7 and 8 show a case where the contact unit 211, the shutter member 501, the protection plate 217, and the discharge mechanism 7 are removed from the connector 1 shown in FIG. 5.

As shown in FIG. 7, a plurality of projecting pieces 219 for protecting the contacts 214 for the card B are provided between the contacts 214 for the card B and the contacts 215 for the card B in the base portion 201 of the housing 2 so as to be aligned in the side-to-side direction of the connector 1. The plurality of projecting pieces 219 protects the contacts 214 for the card B such that the contacts 214 are not buckled by the card B when the card B is inserted.

On the left side of the projecting piece 219 disposed in the leftmost side, a projecting piece 220 for preventing the card B from being inserted in a reverse direction is provided. When the card B is inserted in a proper direction, the projecting piece 220 is housed in a concave portion formed on the bottom surface of the card B. Meanwhile, when the card B is inserted in the reverse direction, the projecting piece 210 abuts on the leading end of the card B, thereby preventing the card B from being inserted in the reverse direction. When the card A is inserted into the connector 1, the projecting piece 220 enters an opening portion 605 formed in the partition plate 6. Therefore, as the card A is inserted, the card A is not restricted from moving toward the lower side of the partition plate 6.

In the base portion 201 of the housing 2, a support piece 221 for supporting the protection plate 217 is provided. The support piece 221 is provided on the left side of the contact 216 for the card C which is disposed in the leftmost side. Similar to the contacts 216 for the card C, the base end of the support piece 221 is fixed to the base portion 201, and the leading end thereof extends slightly upward on the rear side of the connector 1. The support piece 221 is constructed of a metal piece which is larger than the contacts 216 for the card C and is disposed in a slightly upper position from the contacts 216 for the card C.

On the lower side of the discharge mechanism 7, a fixed contact portion 222 composing a portion of the detection mechanism 8 which detects the mounting state of plural types of cards is provided. The detection mechanism 8 having the fixed contact portion 222 detects the mounting state of plural types of cards depending on a conduction state and a non-conduction state based on the contact state between the fixed contact portion 222 and a movable contact portion 721 of the sliding member 701 which will be described below.

Between specific contacts 215 for the card B, a plurality of guide pieces 223 are respectively provided, which guide the bottom surface of the card B when the card B is inserted and mounted. When the contacts 215 for the card B are pressed downward in accordance with the insertion of the card B, the guide pieces 223 abut on the bottom surface of the card B. Further, the plurality of guide pieces 223 compose a first bottom-surface guide portion which guides the bottom surface of the card B during the insertion.

Figure 9:
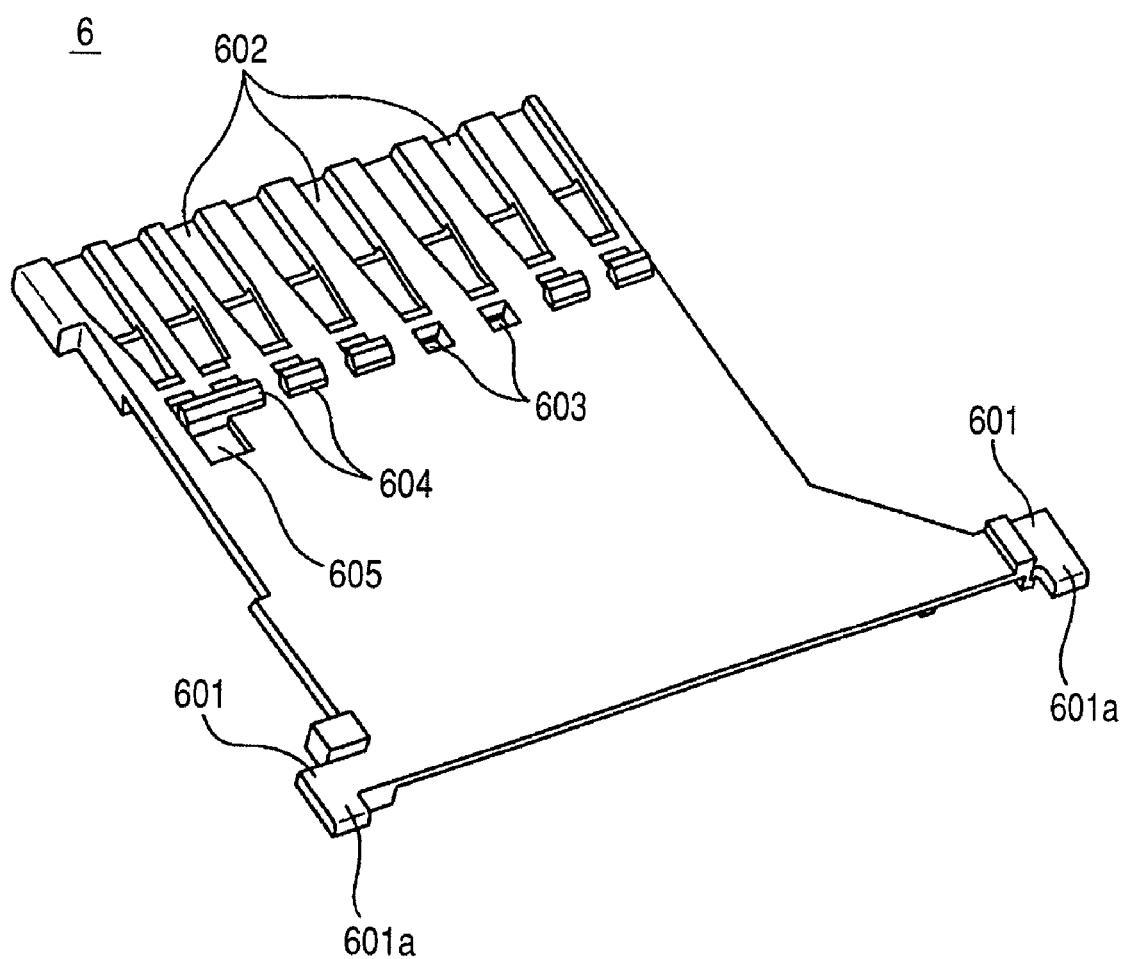
FIG. 9 is a perspective view of a partition plate of the connector according to this embodiment, seen from the upper side.
Figure 10:
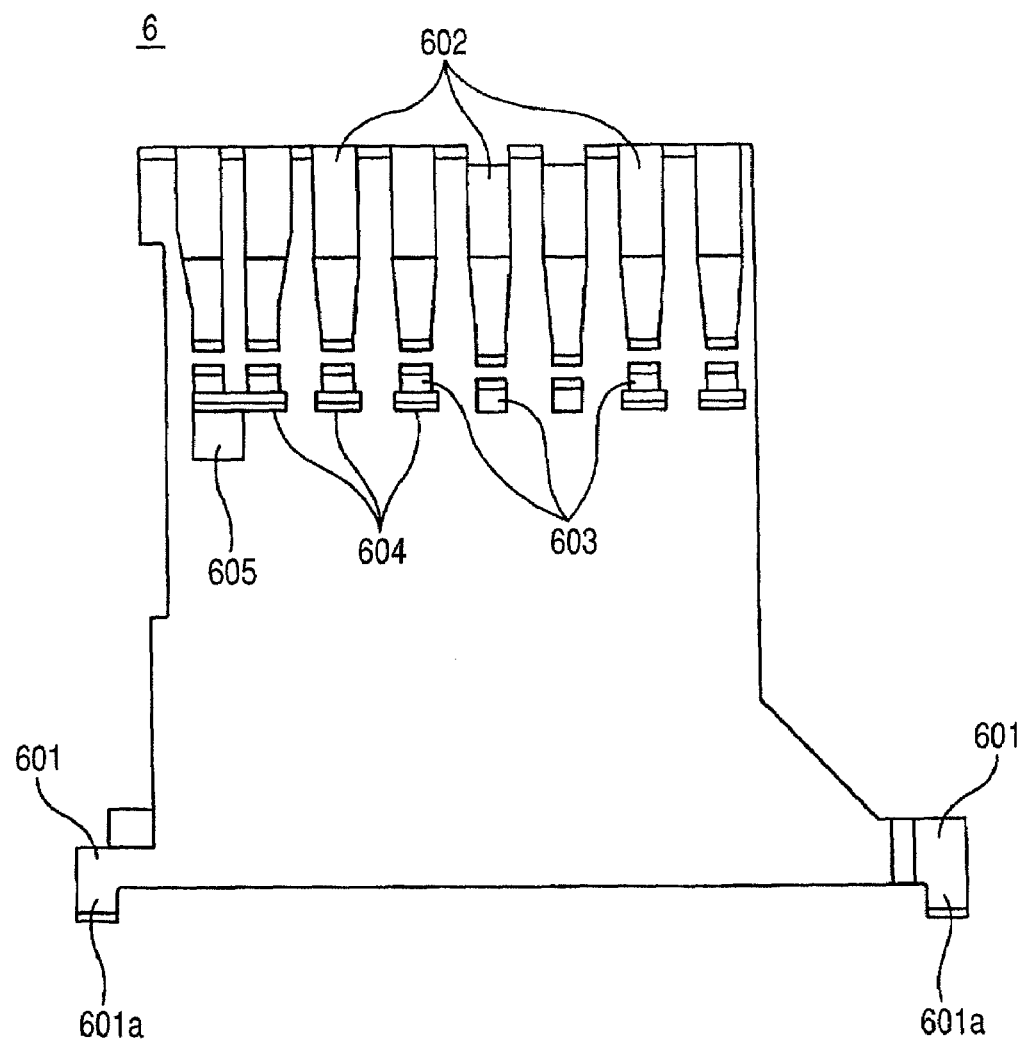
FIG. 10 is a top view of the partition plate of the connector 1 according to this embodiment.
Figure 11:
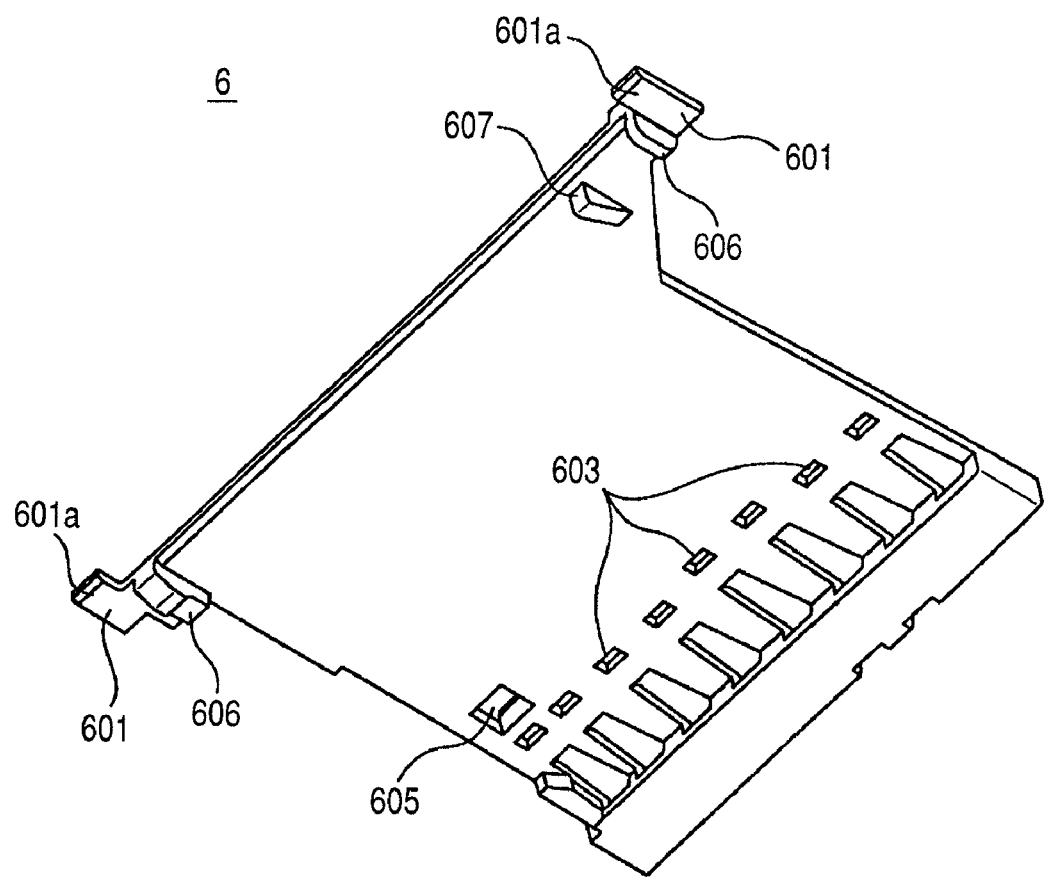
FIG. 11 is a perspective view of the partition plate of the connector according to this embodiment, seen from the lower side.

Now, the construction of main components of the connector 1 according to this embodiment will be described. FIGS. 9 to 11 are diagrams for explaining the construction of the partition plate 6 of the connector 1 according to this embodiment. FIGS. 12 to 14 are diagrams for explaining the construction of the shutter mechanism 5 of the connector 1 according to this embodiment. FIG. 15 is a diagram for explaining the construction of the protection plate 217 of the connector 1 according to this embodiment. FIGS. 16 to 19 are diagrams for explaining the construction of the discharge mechanism 7 of the connector 1 according to this embodiment.

First, the construction of the partition plate 6 of the connector 1 according to this embodiment will be described. FIG. 9 is a perspective view of the partition plate 6 of the connector 1 according to this embodiment, seen from the upper side. FIG. 10 is a top view of the partition plate 6 of the connector 1 according to this embodiment. FIG. 11 is a perspective view of the partition plate 6 of the connector 1 according to this embodiment, seen from the lower side.

At the rear end of the top surface of the partition plate 6, a plurality of concave portions 602 are formed in positions corresponding to the contacts 212 for the card A, as shown in FIGS. 9 to 11. The concave portions 602 are constructed so as to house the vicinities of the base ends of the contacts 212 for the card A. Further, a plurality of opening portions 603 are formed in front-side positions from the concave portions 602. The opening portions 603 are formed in positions corresponding to the leading ends of the contacts 212 for the card A, and are constructed so as to house the leading ends which approach the opening portions 603 as the cards B and C are mounted.

Further, a plurality of projecting pieces 604 are formed in front-side positions from specific opening portions 603. When the card A is inserted in a wrong direction (reverse direction), or when a different card is inserted, the projecting pieces 604 abut on the leading end of the card in the insertion direction, thereby projecting the contacts 212 for the card A. As the contacts 212 for the card A are protected by the projecting pieces 604 provided on the partition plate 6, the contacts for the card A are reliably protected, without an increase in size of the connector 1 caused when a separate member is provided.

The opening portion 605 is formed in a front-side position from the projecting piece 604 disposed in the rightmost side. The opening portion 605 is constructed so as to house the projecting piece 220 formed in the base portion 201 of the housing 2 when the partition plate 6 moves downward.

The arm portion 601 has a locking piece 601a which slightly extends toward the front side. The locking piece 601a is loaded on a support portion 501d of the shutter member 501, which will be described below, in a state where a card is not mounted in the connector 1 (hereinafter, referred to as 'initial state'). When the shutter member 501 is rotated in accordance with the insertion of the card A, the locking piece 601a descends from the support portion 501d so as to move downward. Meanwhile, when the card A is discharged, the locking piece 601a is loaded on the support portion 501d.

Meanwhile, the bottom surface of the partition plate 6 composes a first top-surface guide portion which guides the top surface of the card B. At the front end of the bottom surface of the partition plate 6, a pair of projecting pieces 606 which project downward are formed, as shown in FIG. 11. The projecting piece 606 is formed in the vicinity of the side end of the arm portion 601 and has a predetermined length along the front and rear direction of the connector 1. When the card C is inserted, the projecting pieces 606 abut on the card C so as to move the partition plate 6 toward the upper side, and serves as a transmission member which transmits a biasing force, caused by the biasing pieces 302 of the cover member 3, to the card B. Further, the projecting pieces 606 have a tapered surface formed at the front ends thereof such that the card C easily enters under the partition plate 6.

In a left position of the connector 1 which is slightly separated from the projecting piece 606 disposed in the right side, a projecting piece 607 which projects downward is formed. The projecting piece 607 serves to prevent the card B from being inserted into a wrong position. Specifically, when the card B is inserted so as to deviate from a proper position toward the right side, the projecting piece 607 abuts on the leading end of the card B, thereby preventing the damage of the card B which is caused by the contact with the contacts 214 and 215 for the card B when the card B is inserted into a wrong position.

Figure 12A:
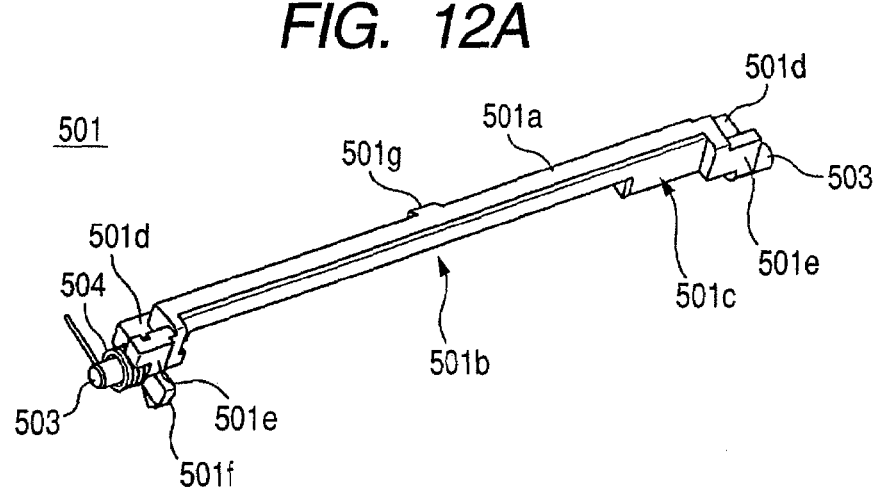
FIGS. 12A to 12C are perspective view, front view, and top view of a shutter member of a shutter mechanism of the connector according to this embodiment.
Figure 12B:
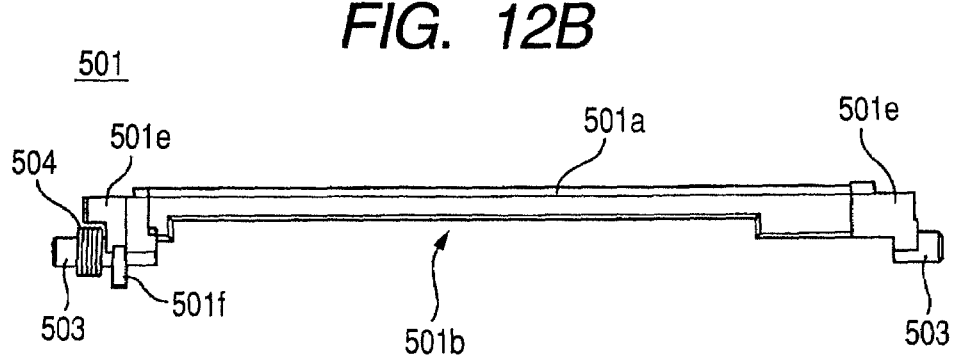
Figure 12C:
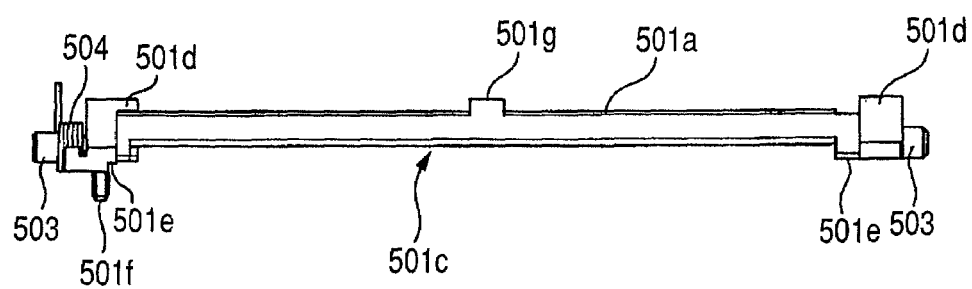
Figure 13A:
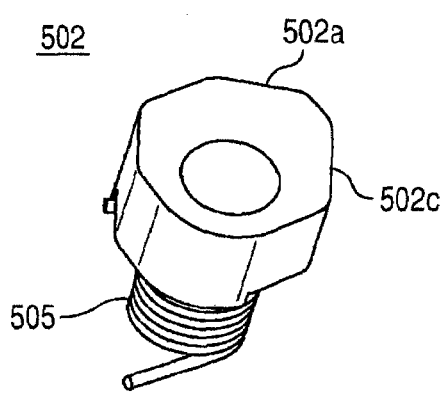
FIGS. 13A to 13D are perspective view, top view, bottom view, and perspective view of an actuator member of the shutter mechanism of the connector according to this embodiment.
Figure 13B:
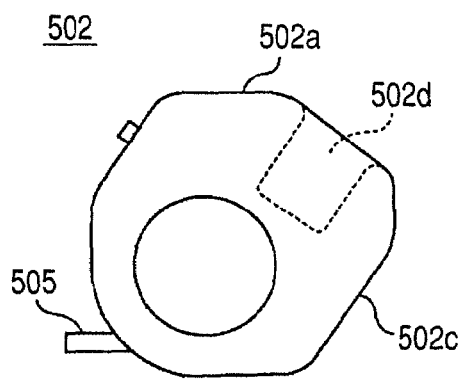
Figure 13C:
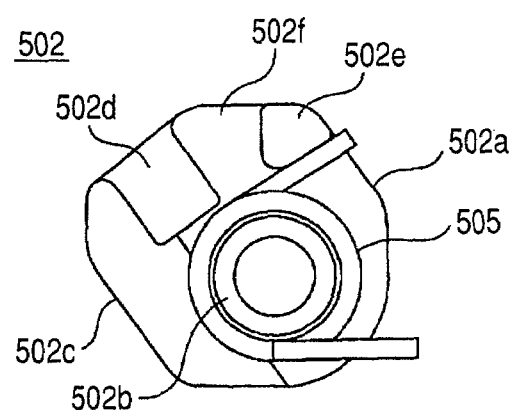
Figure 13D:
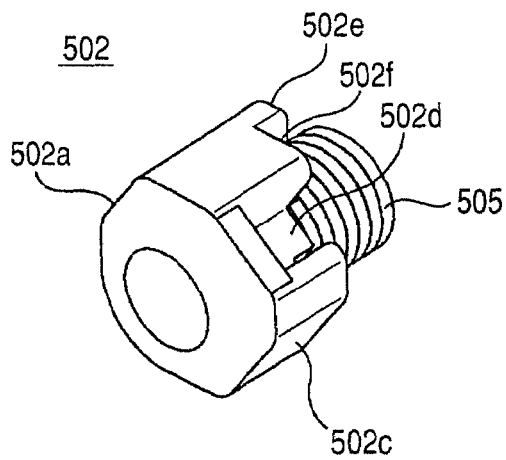

Next, the construction of the shutter mechanism 5 of the connector 1 according to this embodiment will be described. FIGS. 12A to 12C are respectively perspective view, front view, and top view of the shutter member 501 of the shutter mechanism 5 of the connector 1 according to this embodiment. FIGS. 13A, 13B, 13C, and 13D are respectively perspective view, top view, bottom view, and perspective view of the actuator member 502 of the shutter mechanism 5 of the connector 1 according to this embodiment.

As shown in FIGS. 12A to 12C, the shutter member 501 has a shutter main body 501a extending to the side of the connector 1. Further, the shaft 503 is provided in a lower and front position in the side end of the shutter main body 501*a*. The shutter main body 501*a* has a notch portion 501*b* formed in the bottom surface thereof, and the shutter main body 501*a* has a notch portion 501*c* formed in the front surface thereof. The width of the notch portion 501*b* is set to that of the side surface of the card B, and the notch portion 501*b* serves as a guide portion when the card B is inserted. In particular, the bottom surface of the notch portion 501*c* composes the first top-surface guide portion which guides the top surface of the card B when the card B is inserted. Meanwhile, the width of the notch portion 501*c* is set to that of the side surface of the card A, and the notch portion 501*c* serves as a guide portion when the card A is inserted.

The support portion 501*d* which slightly projects toward the rear side is provided on either side of the shutter main body 501*a*. The support portion 501*d* has a plane portion which is horizontally disposed in the initial state, and the rear end of the plane portion supports the locking piece 601*a* of the partition plate 6. The support portion 501*d* has a wall portion 501*e* provided on the front side thereof, the wall portion 501*e* extending upward from the plane portion. The wall portion 501*e* disposed in the left side locks one end of the coil spring 504 attached to the shaft 503. Further, the wall portion 501*e* disposed in the left side has a projecting piece 501*f* provided thereon, the projecting piece 501*f* projecting on the front and lower sides of the connector 1. The projecting piece 501*f* is engaged with a concave portion 502*d* of the actuator member 502, which will be described below, so as to restrict the rotation of the shutter member 501. Further, the shutter main body 501*a* has an engagement piece 501*g* formed thereon, the engagement piece 501*g* projecting toward the rear side in the initial state. When the shutter main body 501*a* is rotated in accordance with the insertion of the card A, the engagement piece 501*g* is engaged with an opening portion 217*b* of the protection plate 217, which will be described below.

As shown in FIG. 13, the actuator member 502 includes an actuator main body 502*a* having a rotating shaft 502*b* which is eccentrically provided on the bottom surface thereof. The actuator main body 502*a* has an abutting surface 502*c* provided on the side surface thereof, the abutting surface 502*c* abutting on the leading end of the card A. The abutting surface 502*c* has a leading end which projects into the insertion path of the card A. On the bottom surface of the actuator main body 502*a*, a concave portion 502*d* is formed in a position on the rear side of the abutting surface 502*c*. When the actuator member 502 and the shutter member 501 are rotated in accordance with the insertion of the card A, the concave portion 502*d* can house the projecting piece 501*f* of the shutter member 501. Further, a locking piece 502*e* which locks one end of the coil spring 505 is formed on the bottom surface of the actuator main body 502*a*. Further, between the locking piece 502*e* and the concave portion 502*d*, a restriction portion 502*f* is provided, which faces the projecting piece 501*f* of the shutter member 501 in a state where a card is not inserted, and restricts the rotation of the shutter member 501.

Figure 14A:
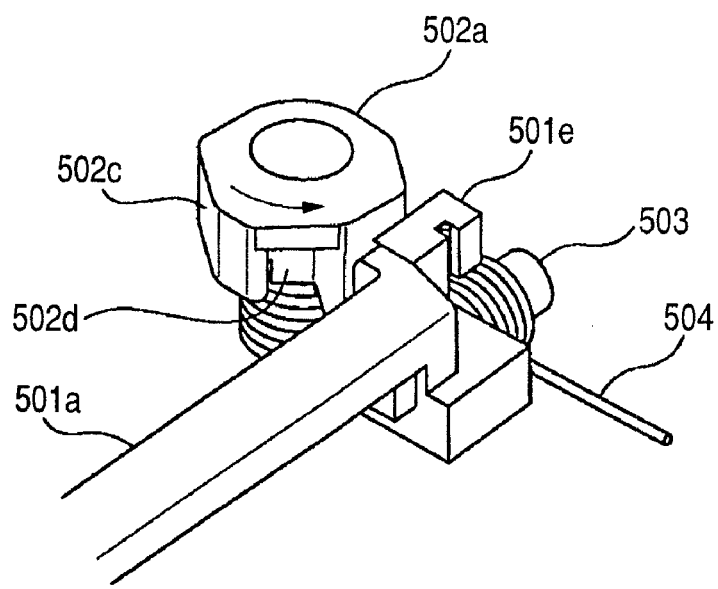
FIGS. 14A and 14B are perspective views for explaining the operation of the shutter mechanism of the connector according to this embodiment.
Figure 14B:
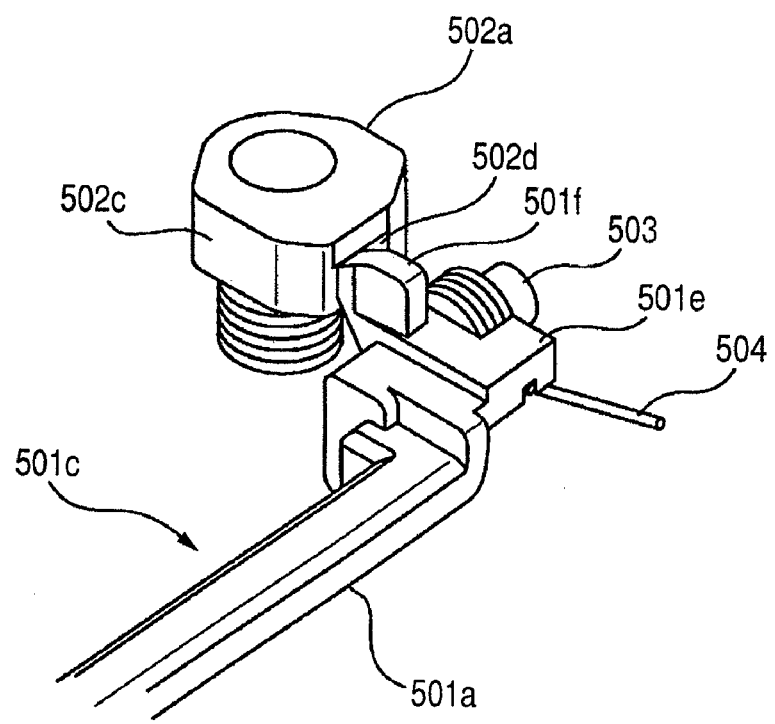

Now, the operation of the shutter mechanism 5 of the connector 1 according to this embodiment will be described. FIGS. 14A and 14B are perspective views for explaining the operation of the shutter mechanism 5 of the connector 1 according to this embodiment. FIG. 14A shows a state where the card A is not inserted into the connector 1, and FIG. 14B shows a state where the card A is inserted into the connector 1.

As shown in FIG. 14A, a portion of the abutting surface 502*c* of the actuator member 502 projects into the insertion path of the card A in a state where the card A is not inserted into the connector 1. At this time, the concave portion 502*d* is directed to the slightly right side from the rear side of the connector 1. Meanwhile, the notch portion 501*c* of the shutter member 501 is directed to the card insertion port 4. At this time, the projecting portion 501*f* of the shutter member 501 faces the restriction portion 502*f* of the actuator member 502 such that the rotation of the shutter member 501 is restricted.

When the card A is inserted from the state shown in FIG. 14A, the leading end of the card A abuts on the abutting surface 502*c*, and the actuator main body 502*a* is rotated in an arrow direction shown in FIG. 14A. At this time, the concave portion 502*d* is directed toward the rear side of the connector 1. Further, since the restriction portion 502*f* retreats from the position of the projecting piece 501*f* of the shutter member 501, the shutter member 501 is rotated. Meanwhile, the leading end of the card A abuts on the notch portion 501*c* of the shutter member 501. Further, the shutter member 501 is rotated so as to fall down to the rear side, with the shaft 503 being set to a supporting point, and the notch portion 501*c* is directed to the upper side. At this time, the projecting piece 501*f* of the shutter member 501 moves upward in accordance with the rotation of the shutter member 501 so as to be engaged with the concave portion 502*d* of the actuator member 502, as shown in FIG. 14B.

When the card A is mounted, the card A is loaded on the notch portion 501*c*. Therefore, the shutter member 501 maintains the state shown in FIG. 14B. Accordingly, the projecting piece 501*f* maintains a state where it is engaged with the concave portion 502*d*. As long as the card A is not discharged from the connector 1, the shutter member 501 does not return to the state shown in FIG. 14A.

Figure 15A:
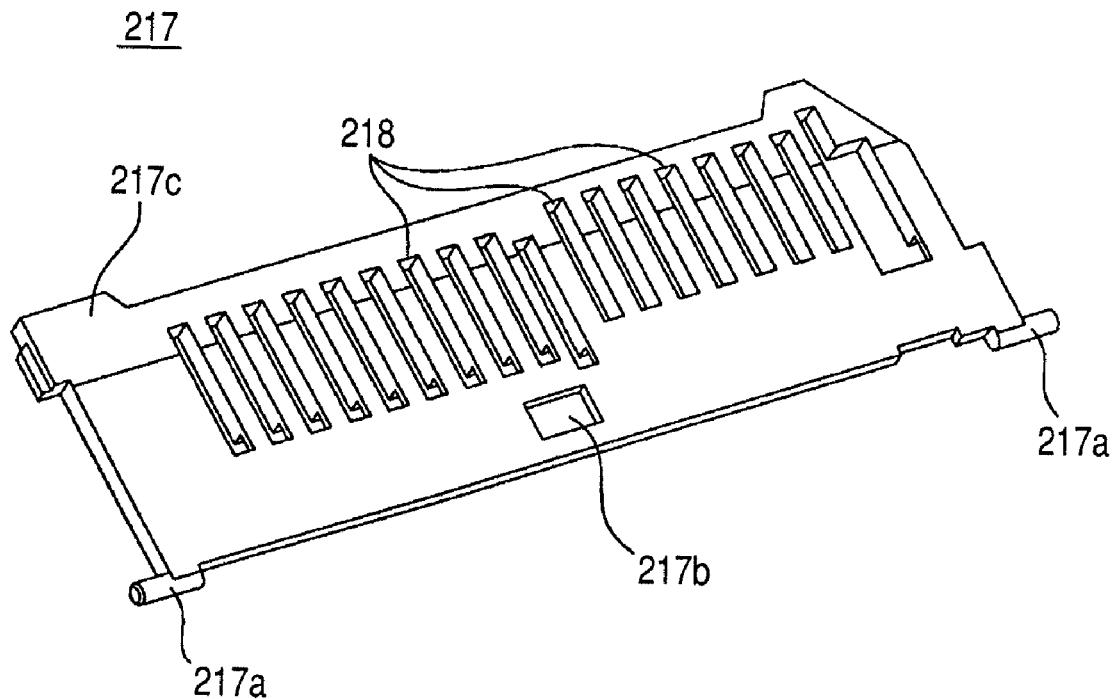
FIGS. 15A and 15B are perspective view and top view of the protection plate of the connector according to this embodiment.

Next, the construction of the protection plate 217 of the connector 1 according to this embodiment will be described. FIG. 15A is a perspective view of the protection plate 217 of the connector 1 according to this embodiment, and FIG. 15B is a top view of the protection plate 217 of the connector 1 according to this embodiment.

Figure 15B:
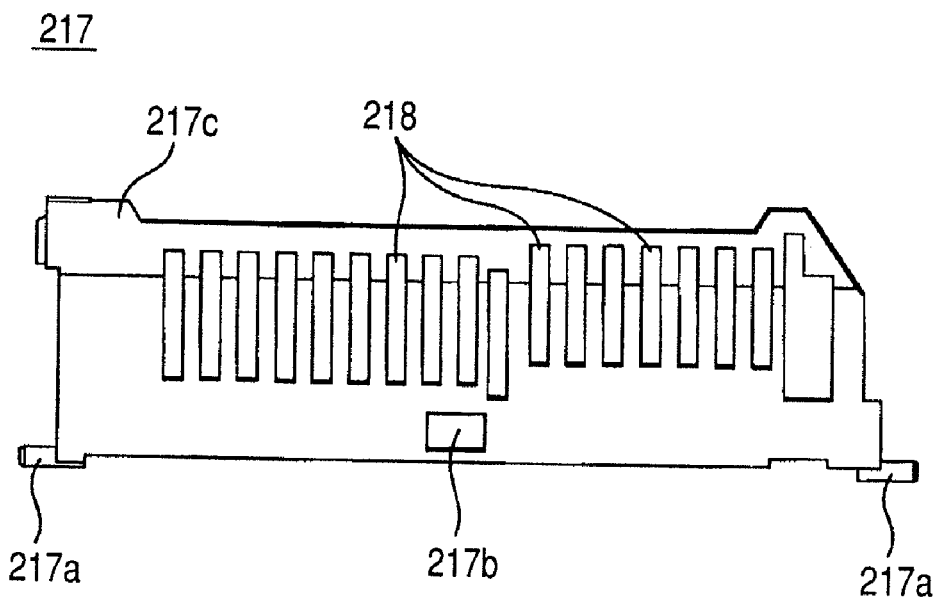

As shown in FIGS. 15A and 15B, the protection plate 217 has a shaft portion 217*a* in either front end thereof, the shaft portion 217*a* extending to the side of the connector 1. As the shaft portion 217*a* is inserted into a hole (not shown) formed in the side wall portion 202 of the housing 2, the protection plate 217 is supported by the housing 2 such that the rear end thereof can slightly swing. Further, a rectangular opening portion 217*b* is formed on the front side of the grooves 218 formed in the protection plate 217. The opening portion 217*b* is disposed in a position at which it can house the engagement piece 501*g* formed in the shutter main body 501*a* when the shutter main body 501*a* is rotated in accordance with the insertion of the card A.

When a card is not inserted, the protection plate 217 is supported by the support piece 221 provided on the housing 2 in a state where the protection plate 217 is inclined as shown in FIG. 15A. On the top surface of the protection plate 217, a support surface 217*c* is formed in the vicinity of the rear end of the protection plate 217. In a state where a card is not inserted, the inclination angle of the support surface 217*c* is set to be slightly smaller than that of the other surface of the protection plate 217. The support surface 217*c* serves as a second bottom-surface guide portion which guides the bottom surface of the card B while the card B is inserted.

Figure 16:
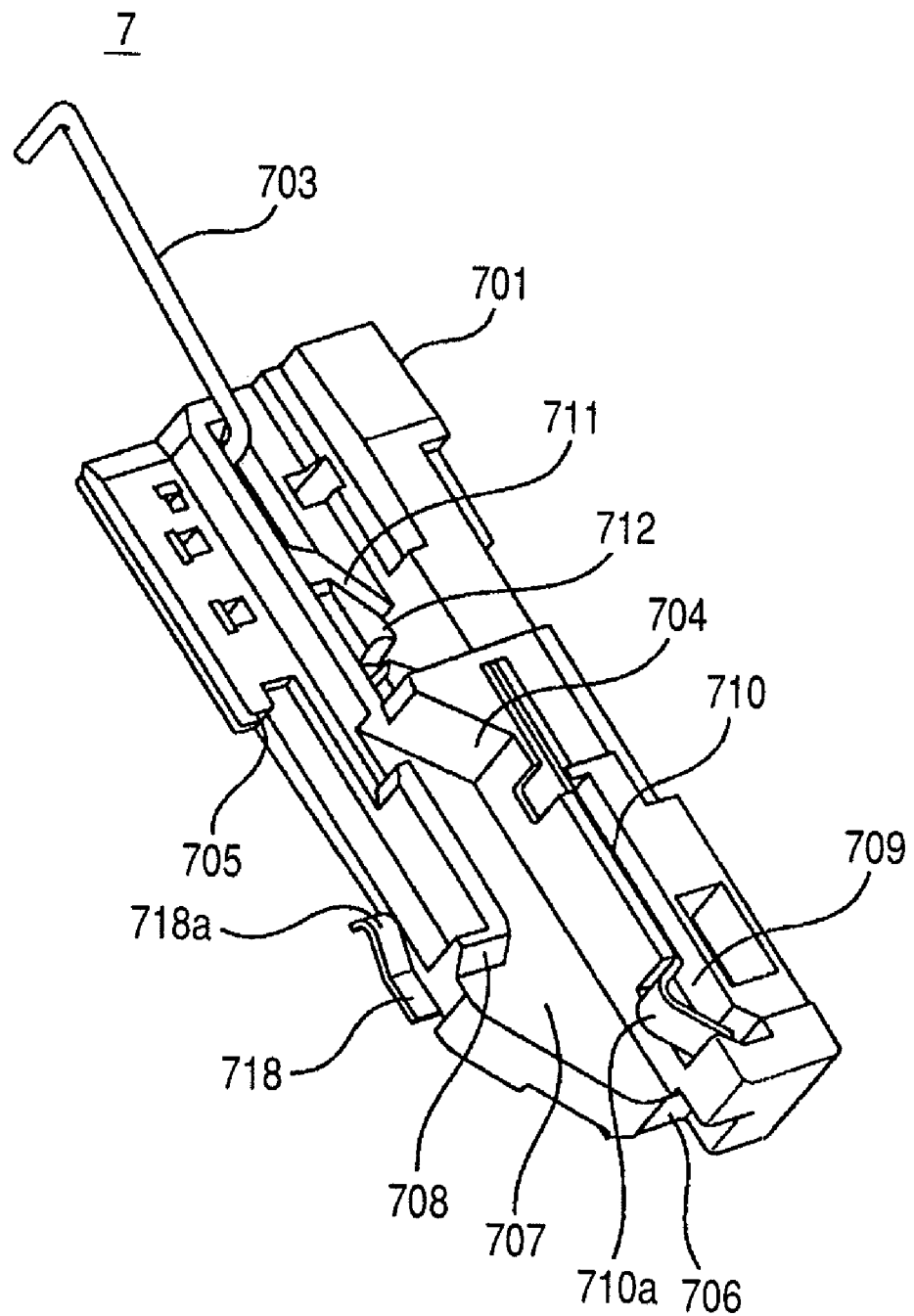
FIG. 16 is a perspective view of a discharge mechanism of the connector according to this embodiment, when seen from the upper side.
Figure 17:
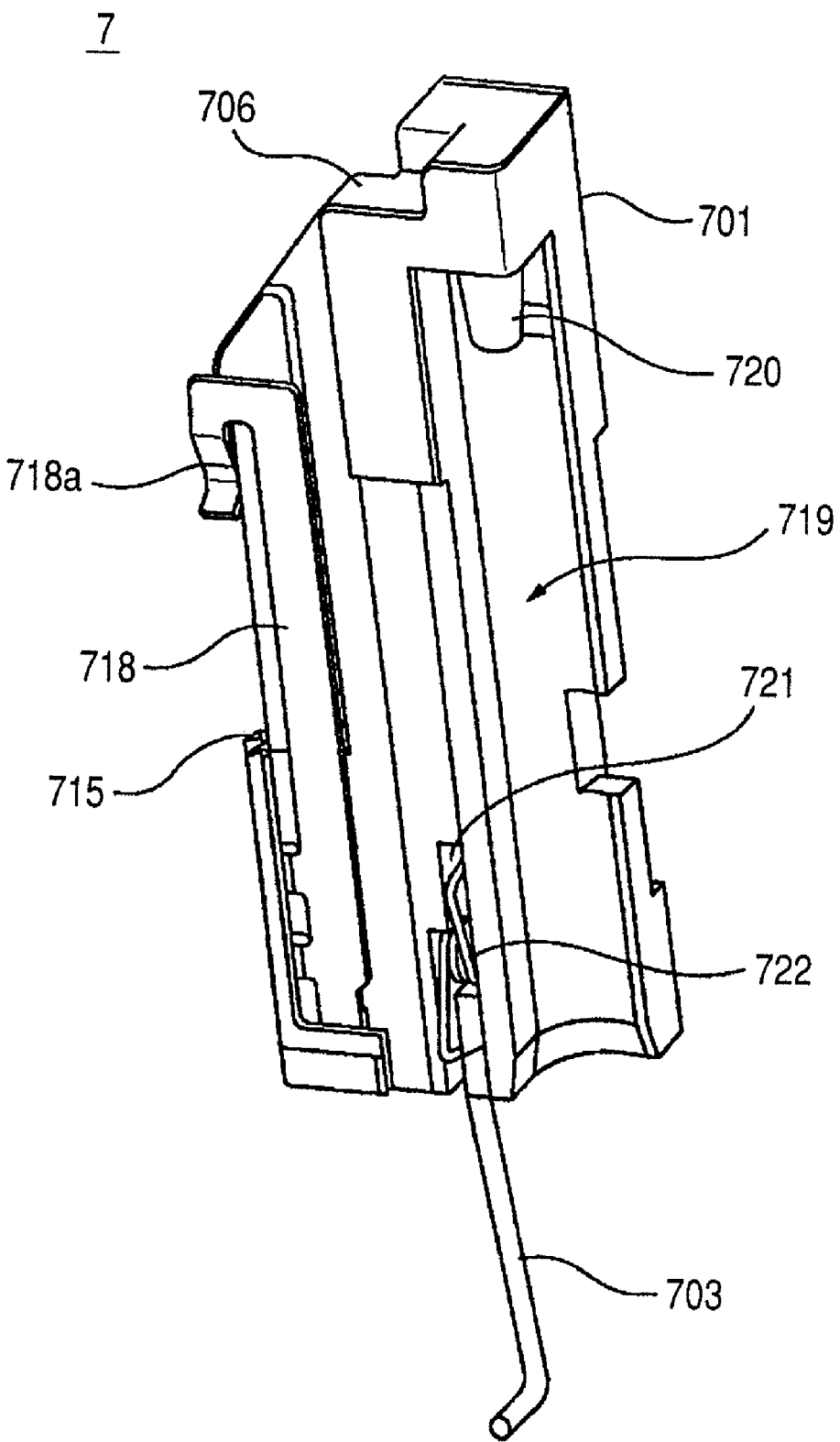
FIG. 17 is a perspective view of the discharge mechanism of the connector according to this embodiment, when seen from the lower side.
Figure 19:
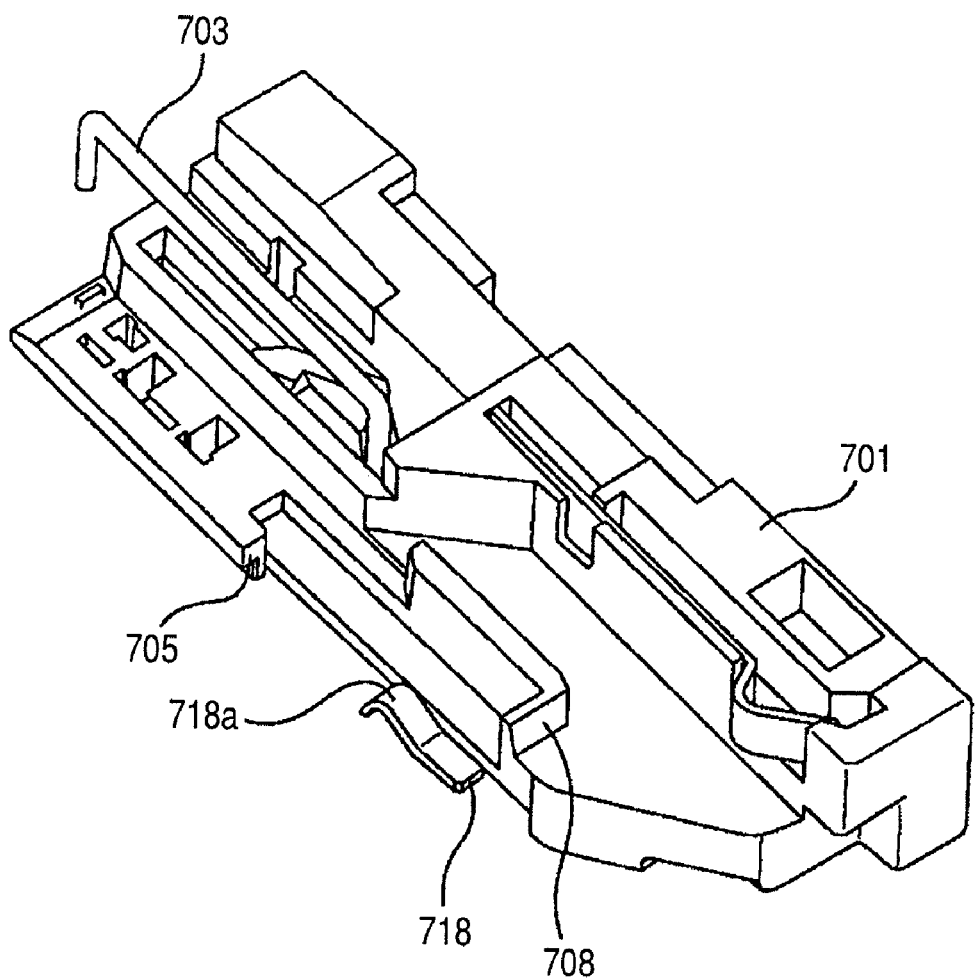
FIG. 19 is a perspective view of the discharge mechanism of the connector according to this embodiment, when seen from the upper side.

Next, the construction of the discharge mechanism 7 of the connector 1 according to this embodiment will be described. FIG. 16 is a perspective view of the discharge mechanism 7 of the connector 1 according to this embodiment, when seen from the upper side. FIG. 17 is a perspective view of the discharge mechanism 7 of the connector 1 according to this embodiment, when seen from the lower side. FIGS. 18A and 18B are top and bottom views of the discharge mechanism 7 of the connector 1 according to this embodiment. FIG. 19 is a perspective view of the discharge mechanism 7 of the connector 1 according to this embodiment, when seen from the upper side. FIG. 19 shows a state of the discharge mechanism 7 when a card is mounted. In FIGS. 16 to 19, the compression spring 702 composing the discharge mechanism 7 is omitted.

As shown in FIGS. 16 to 18, the sliding member 701 includes a first abutting portion 704 which abuts on the right leading end of the card A, a second abutting portion 705 which abuts on the right leading end of the card B, and a third abutting portion 706 which abuts on the right leading end of the card C. The first abutting portion 704 is provided on the upper side portion of the sliding member 701, and the second and third abutting portions 705 and 706 are provided on the lower side portion of the sliding member 701.

The first abutting portion 704 is disposed in a card mounting space corresponding to the card A, and the second and third abutting portions 705 and 706 are disposed in card mounting spaces corresponding to the cards B and C, respectively. In other words, since the sliding member 701 is disposed across the card mounting space corresponding to the card A and the card mounting spaces corresponding to the cards B and C, the cards A, B, and C can be discharged by the single sliding member 701.

The first abutting portion 704 is constructed of an inclined surface in accordance with the shape of the leading end of the card A, and the second and third abutting portions 705 and 706 are constructed of a plane surface perpendicular to the insertion direction of the card. The first to third abutting portions 704 to 706 of the sliding member 701 abut on the cards A to C, respectively, and the sliding member 701 can slide in the front and rear direction of the connector 1 as a user inserts the respective cards.

On the front side of the first abutting portion 704, a plane portion 707 supporting a portion of the bottom surface of the card A is provided. The plane portion 707 has a projecting piece 708 erected on the left end thereof, the projecting piece 708 protecting the contact for the card A which is disposed in the rightmost side of the contact unit 211. On the right side of the plane portion 707, a groove portion 709 which is opened to the upper side is formed. In the groove portion 709, a locking piece 710 is mounted, which locks the card A inserted into the connector 1. The locking piece 710 has a convex portion 710a provided in the front-side portion of the sliding member 701, the convex portion 710a projecting toward the left side. The convex portion 710a is engaged with a concave portion formed in the right side surface of the card A so as to lock the card A inserted into the connector 1. Accordingly, the card A mounted in the connector 1 is prevented from coming off.

On the top surface of the sliding member 701, a loop-shaped guide groove 711 is formed on the rear side of the first abutting portion 704. In the center of the guide groove 711, a heart-shaped cam 712 is provided. As shown in FIG. 18A, the guide groove 711 includes first and second guide grooves 713 and 714, which are disposed in both sides of the heart-shaped cam 712, a recessed groove 716 having a locking portion 715 which locks the locking member 703, and a linear guide groove 717. The locking member 703 advances along the guide groove 711 in a predetermined direction in accordance with the insertion operation of the card. Further, on the guide path of the locking member 703 in the guide groove 711, a step portion is formed, which prevents the locking member 703 from advancing in the reverse direction.

In such a guide groove 711, when a card is not mounted, the locking member 703 is disposed at the rear end of the linear guide groove 717, as shown in FIG. 18A. When a card is inserted, the locking member 703 advances into the first guide groove 713 through the guide groove 717 as the sliding member 701 moves toward the rear side. Further, when the card is pushed to a position at which the locking member 703 reaches the front end of the first guide groove 713, the locking member 703 advances into the recessed groove 716 so as to be locked to the locking portion 715, as shown in FIG. 19.

When the card is further pushed after the locking member 703 is locked to the locking portion 715, the locking member 703 advances into the second guide groove 714 from the recessed groove 716. Then, the locking member 703 advances from the second guide groove 714 into the linear guide groove 717 so as to be disposed at the rear end of the guide groove 717.

On the lower side of the second abutting portion 705, a locking piece 718 which locks the card B inserted into the connector 1 is attached. The locking piece 718 is formed of an elongated plate-shaped member. The front-side end of the locking piece 718 has a shape which is folded toward the rear side in the connector 1. In the leading end of the locking piece 718 directed to the rear side, a convex portion 718a is formed, which slightly projects upward. The convex portion 718a is engaged with a concave portion formed on the bottom surface of the card B so as to lock the card B inserted into the connector 1. Accordingly, the card B mounted in the connector 1 is prevented from coming off.

As shown in FIG. 17, the sliding member 701 has a concave portion 719 formed on the bottom surface thereof, the concave portion 719 housing a compression spring 702. On the front side of the concave portion 719, a holding piece 720 is provided, which holds one end of the compression spring 702. The holding piece 720 has a cylindrical shape as a whole and extends by a predetermined length toward the rear side of the connector 1. On the left side of the concave portion 719 on the rear side of the sliding member 701, a groove portion 721 is formed. In the groove portion 721, a movable contact portion 722 is mounted. The movable contact portion 722 is constructed of a torsion spring. Both ends of the torsion spring are set so as to project slightly downward from the bottom surface of the sliding member 701. The projecting portions come in contact with the fixed contact portion 222 provided in the housing 2, depending on the position of the sliding member 701.

Next, an operation when the respective cards are mounted on the connector 1 according to this embodiment will be described. FIGS. 20 to 26 are diagrams for explaining an operation when the card A is mounted on the connector 1 according to this embodiment. FIGS. 27 to 31 are diagrams for explaining an operation when the card B is mounted on the connector 1 according to this embodiment. FIGS. 32 to 36 are diagrams for explaining an operation when the card C is mounted on the connector 1 according to this embodiment. In FIGS. 20 to 36, the cover member 3 is omitted for convenience of description.

Figure 20:
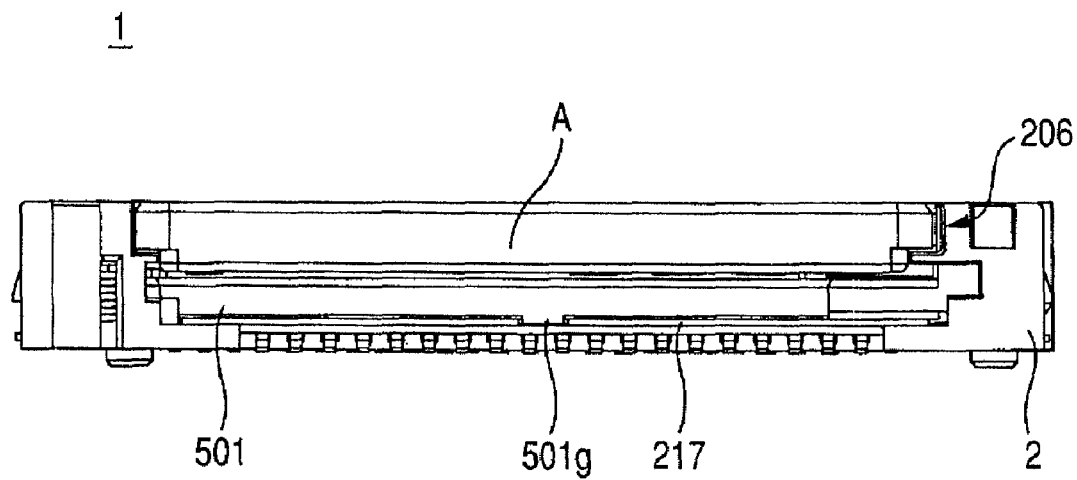
FIG. 20 is a front view of the connector, showing a case where a card A is inserted into the connector.
Figure 21:
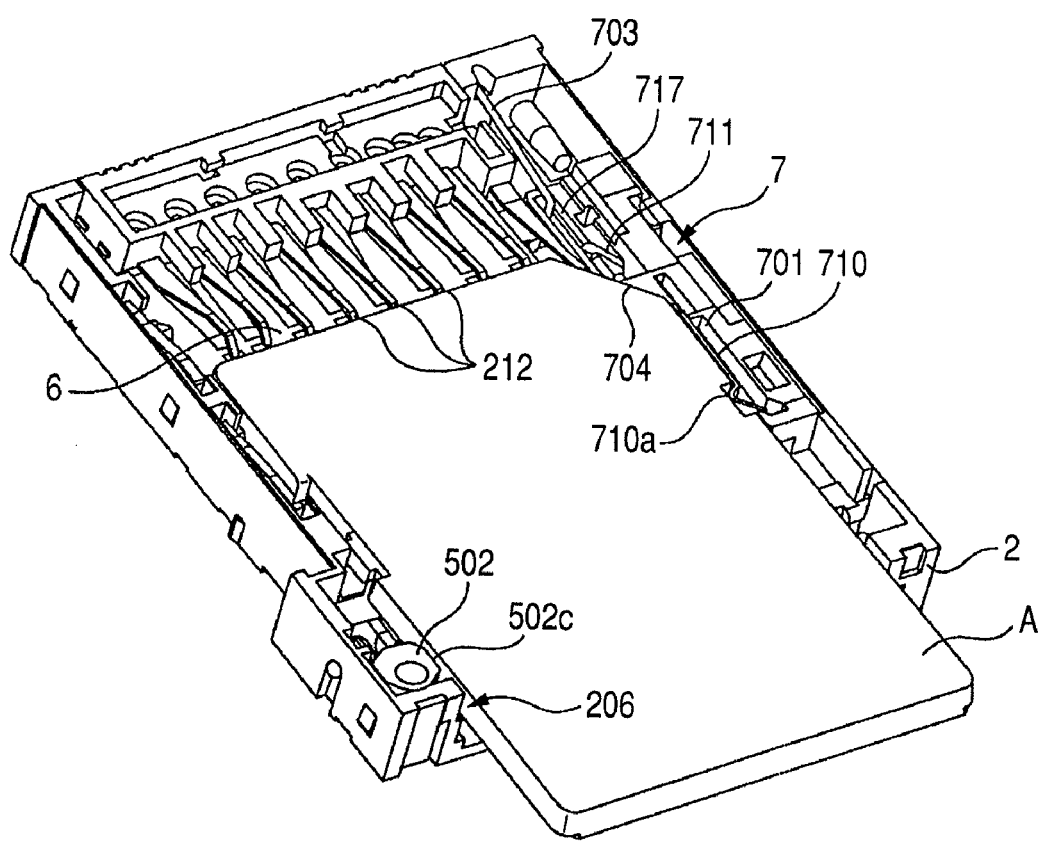
FIG. 21 is a perspective view of the connector, showing a case where the card A is inserted into the connector.
Figure 22:
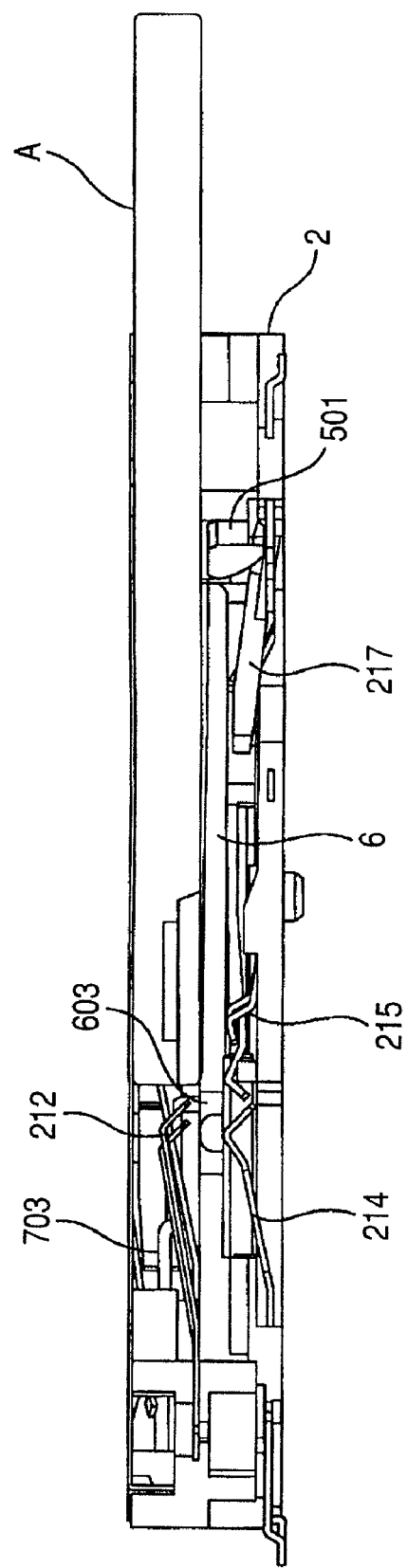
FIG. 22 is a sectional view of the connector in the state shown in FIG. 21.
Figure 23:
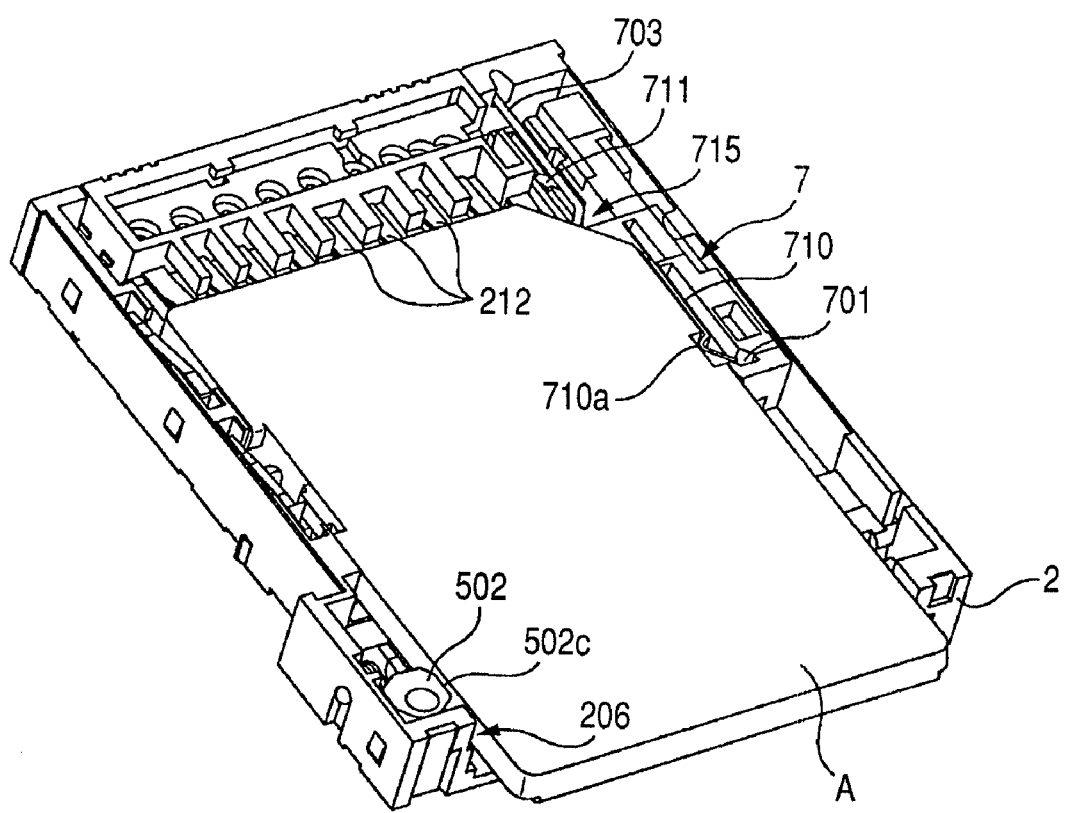
FIG. 23 is a perspective view of the connector, showing a case where the card A is mounted on the connector.
Figure 24:
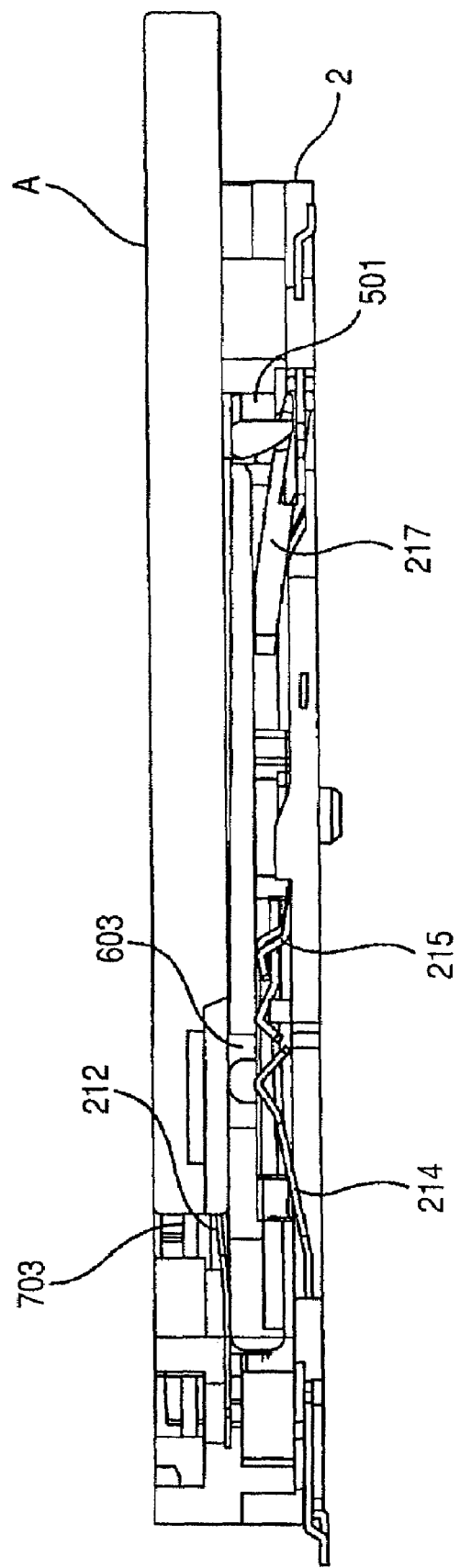
FIG. 24 is a sectional view of the connector in the state shown in FIG. 22.

First, the operation when the card A is mounted on the connector 1 according to this embodiment will be described. FIG. 20 is a front view of the connector 1, showing a case where the card A is inserted into the connector 1. FIG. 21 is a perspective view of the connector 1, showing a case where the card A is inserted into the connector 1. FIG. 22 is a sectional view of the connector 1 in the state shown in FIG. 21. FIG. 23 is a perspective view of the connector 1, showing a case where the card A is mounted on the connector 1. FIG. 24 is a sectional view of the connector 1 in the state shown in FIG. 22. Before the card A is inserted, the connector 1 is set in the state shown in FIGS. 2 to 4.

As shown in FIG. 20, when the card A is mounted on the connector 1 according to this embodiment, the card A is pushed into the connector 1 in a state where the side and bottom surfaces of the card A are fitted in the first guide portion 206 provided in the housing 2. While the card A is pushed into the connector 1, the leading end of the card A abuts on the abutting surface 502c of the actuator member 502 and the shutter member 501. Accordingly, the actuator member 502 is rotated in the rear side, and the shutter member 501 is rotated so as to fall down to the rear side. As this time, the abutting surface 502c of the actuator member 502 is set to face the left side surface of the card A, as shown in FIG. 21.

When the card A is pushed in such a manner, the card A advances on the upper side of the partition plate 6 toward the rear side of the connector 1 as shown in FIGS. 21 and 22. In this case, the partition plate 6 moves slightly downward in such a manner that the bottom surface thereof slightly presses down the contacts 214 and 215 for the card B. As the bottom surface of the partition plate 6 slightly presses down the contacts 214 and 215 for the card B in accordance with the insertion of the card A, the limited space within the connector 1 is effectively utilized.

Further, as shown in FIG. 21, the right leading end of the card A abuts on the first abutting surface 704 of the sliding member 701 in an upper position from the partition plate 6, and the convex portion 710a of the projecting piece 710 of the sliding member 701 is engaged with the concave portion formed on the right side surface of the card A. As the convex portion 710a is engaged with the concave portion of the card A, the position of the card A with respect to the sliding member 701 is determined. After that, the sliding member 701 and the card A move together. Further, when the leading end of the card A abuts on the first abutting surface 704, the front-side end of the locking member 703 is disposed in the vicinity of the rear end of the linear guide groove 717 of the guide groove 711.

When the card A is further pushed from the state shown in FIGS. 21 and 22, the contacts 212 for the card A enter under the bottom surface of the card A so as to come in contact with the contact pad formed on the bottom surface of the leading end of the card A, as shown in FIGS. 23 and 24. FIGS. 23 and 24 show a case where the card A is pushed to the rearmost position of the connector 1, and the hand is separated from the card A. In this state, the front-side end of the locking member 703 is locked to the locking portion 715.

When the sliding member 701 moves toward the rear side in accordance with the insertion of the card A, the detection mechanism 8 of the connector 1 according to this embodiment, which is provided on the lower side of the sliding member 701, detects the mounting state of the card A. Specifically, the detection mechanism 8 detects the mounting of the card A on the basis of the position of the movable contact portion 722 mounted on the bottom surface of the sliding member 701 with respect to the fixed contact portion 222 provided in the housing 2.

In the detection mechanism 8, when the sliding member 701 moves to the position shown in FIGS. 23 and 24, the movable contact portion 722 and the fixed contact portion 222 are contacted with each other such that the conduction state therebetween is set. Meanwhile, before the sliding member 701 reaches the position shown in FIGS. 23 and 24, the movable contact portion 722 and the fixed contact portion 222 are not contacted with each other such that the non-conduction state therebetween is set. The detection mechanism 8 detects the mounting state of the card A depending on the conduction state and the non-conduction state between the movable contact portion 722 and the fixed contact portion 222. As such, since the detection mechanism 8 is composed of the fixed contact portion 222 provided in the housing 2 and the movable contact portion 722 provided in the sliding member 701, it is possible to reliably detect the mounting of the card A without an increase in the number of components. Further, the mounting state of the cards B and C is detected in the same manner.

In the connector 1 according to this embodiment, the detection mechanism 8 provided on the left side of the partition plate 6 detects whether the card A is mounted or not and the state of the writing prevention function of the card A. Here, the operation when the detection mechanism 8 detects the state of the writing prevention function of the card A will be described.

Figure 25:
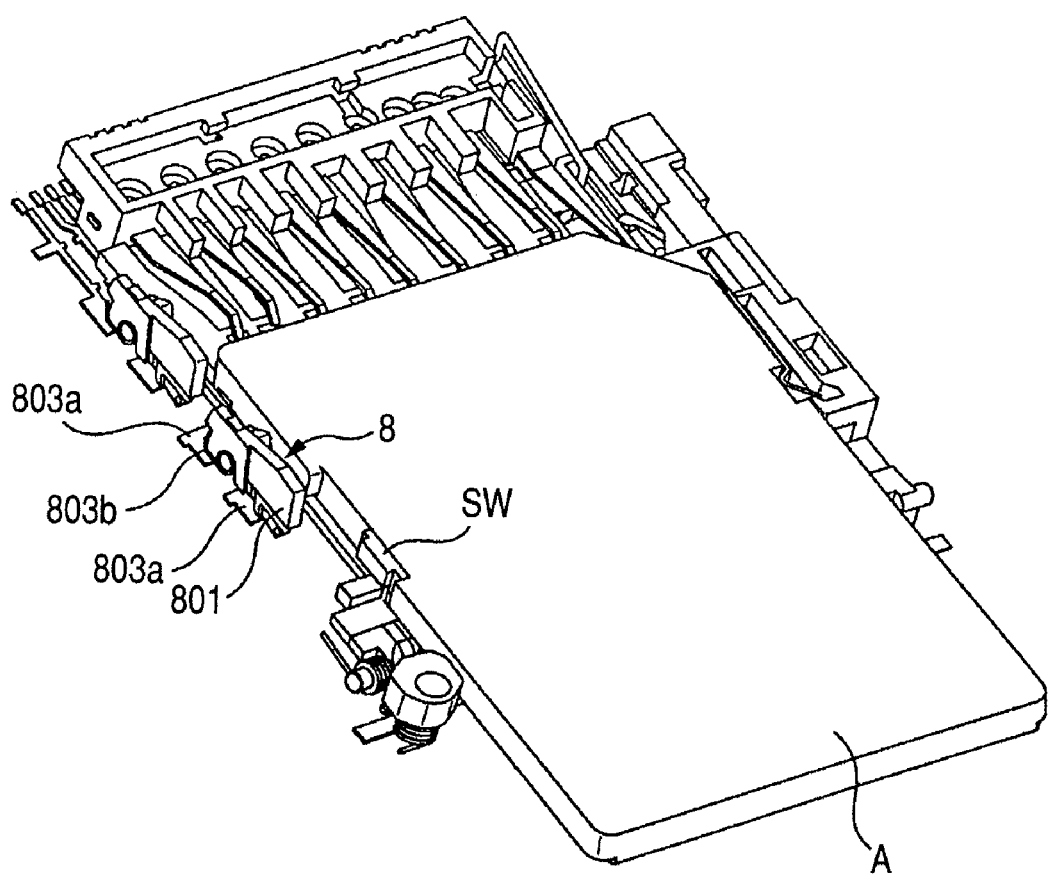
FIG. 25 is a perspective view for explaining the operation when a detection mechanism detects the state of a writing prevention function of the card A, in the connector according to this embodiment.
Figure 26:
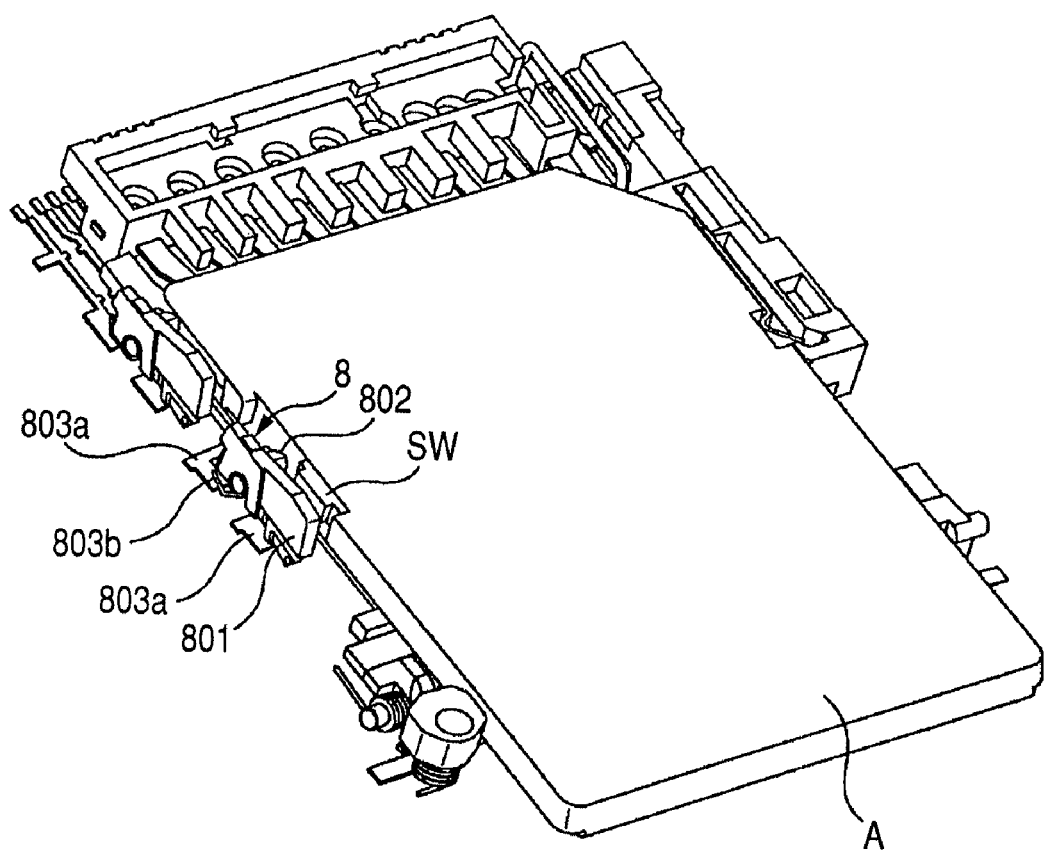
FIG. 26 is a perspective view for explaining the operation when a detection mechanism detects the state of a writing prevention function of the card A, in the connector according to this embodiment.

FIGS. 25 and 26 are perspective views for explaining the operation when the detection mechanism 8 detects the state of the writing prevention function of the card A, in the connector 1 according to this embodiment. In FIGS. 25 and 26, a portion of the housing 2 is omitted for convenience of description. FIG. 25 shows the connector 1 in the state shown in FIG. 21, and FIG. 26 shows the connector 1 in the state shown in FIG. 23. FIGS. 25 and 26 show a state where the writing prevention function of the card A is turned on (where writing is locked). That is, FIGS. 25 and 26 show a case where a writing prevention switch SW is switched to a front side position of the connector 1.

The state of the writing prevention function of the card A is detected by the detection mechanism 8 disposed on the front side of the connector 1. As shown in FIG. 25, the left leading end of the card A abuts on the abutting portion 802 in a state where the writing prevention switch SW does not reach the detection mechanism 8. Further, as the rear end of the abutting portion 802 is pushed down, the rear side of the plate-shaped portion 801 is inclined downward. In this case, both ends of the movable contact portion 803b come in contact with the fixed contact portion 803a such that the fixed contact portion 803a and the movable contact portion 803b are electrically connected. When the card A is positioned in a predetermined mounting position, the writing prevention switch SW abuts on the abutting portion 802. When the fixed contact portion 803a and the movable contact portion 803b are electrically connected to each other, it is recognized that the writing prevention function is turned off.

When the card A is further pushed from this state, the writing prevention switch SW reaches the position of the detection mechanism 8, but does not abut on the abutting portion 802, as shown in FIG. 26. Since the abutting portion 802 is not pushed down, the plate-shaped portion 801 is biased upward by a biasing force of the movable contact portion 803b so as to be horizontally aligned. In this case, a rear-side end of the movable contact portion 803b is separated from the fixed contact portion 803a such that the non-conduction state between the fixed contact portion 803a and the movable contact portion 803b is set. When the card A is positioned at a predetermined mounting position, the writing prevention switch SW does not abut on the abutting portion 802. When the fixed contact portion 803a and the movable contact portion 803b are not electrically connected, it is recognized that the writing prevention function is turned on.

In a state where the writing prevention function of the card A is turned off (when the writing is not locked), the writing prevention switch SW is switched to a position on the rear side of the connector 1. In this case, when the card A is mounted on the connector 1, the writing prevention switch SW abuts on the abutting portion 802, and the abutting portion 802 is pushed down. Therefore, both ends of the movable contact portion 803*b* come in contact with the fixed contact portion 803*a* such that the fixed contact portion 803*a* and the movable contact portion 803*b* are electrically connected. Accordingly, in this case, it is recognized that the writing prevention function is turned off. Further, the detection of whether the card A is mounted or not is performed in the same manner by the detection mechanism 8 disposed on the rear side of the connector 1, using the leading end of the card A.

Figure 27:
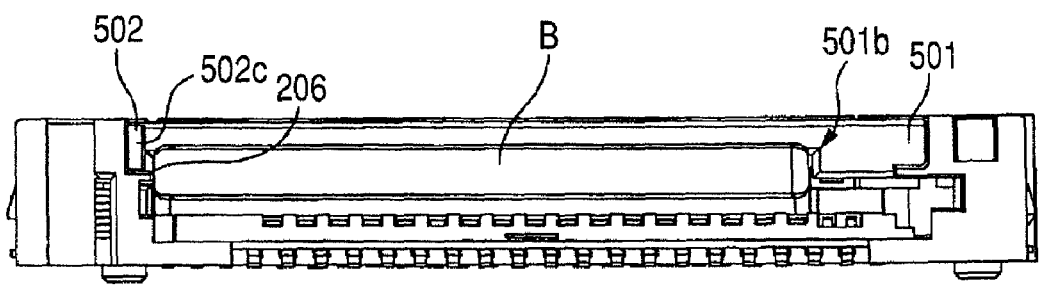
FIG. 27 is a front view of the connector according to this embodiment, showing a case where a card B is inserted into the connector.
Figure 28:
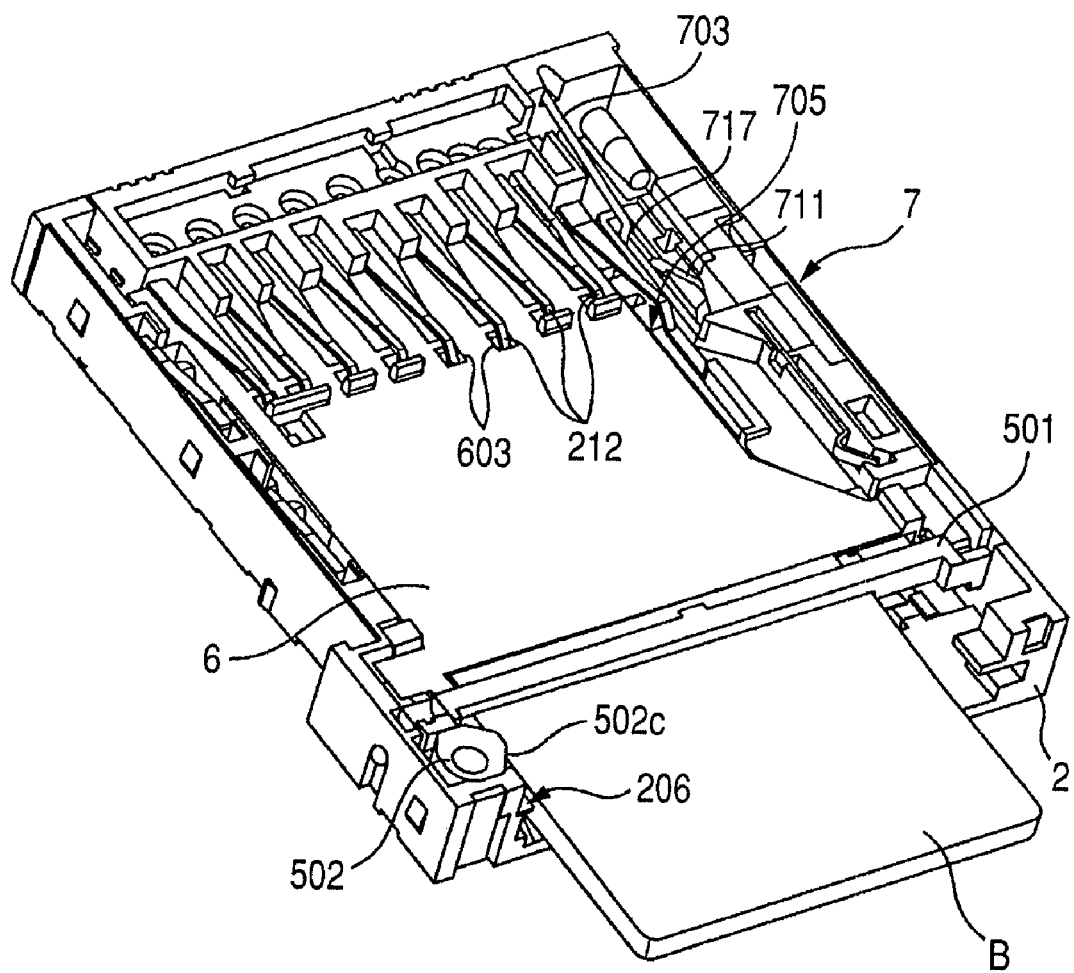
FIG. 28 is a perspective view of the connector according to this embodiment, showing a case where the card B is inserted into the connector.
Figure 29:
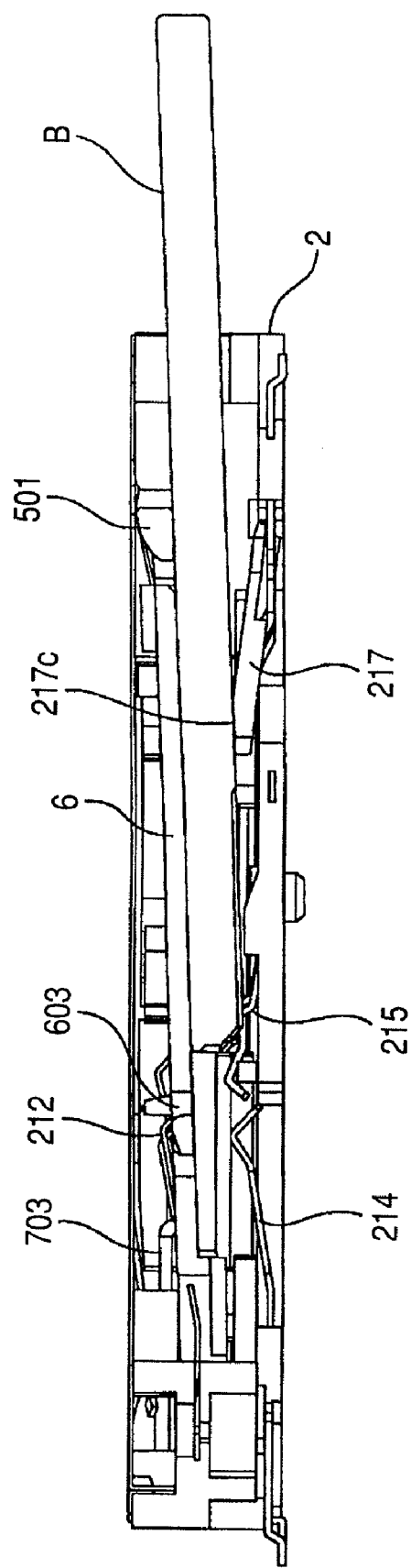
FIG. 29 is a sectional view of the connector in the state shown in FIG. 28.
Figure 30:
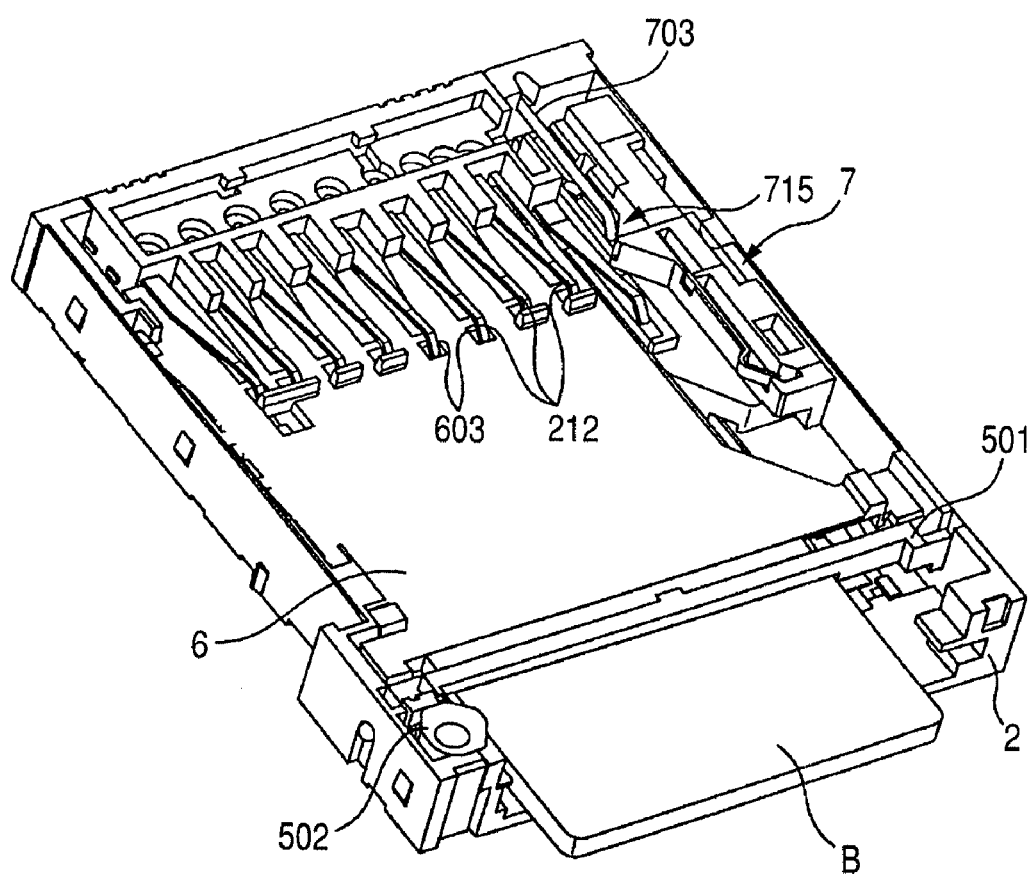
FIG. 30 is a perspective view of the connector according to this embodiment, showing a case where the card B is mounted on the connector.
Figure 31:
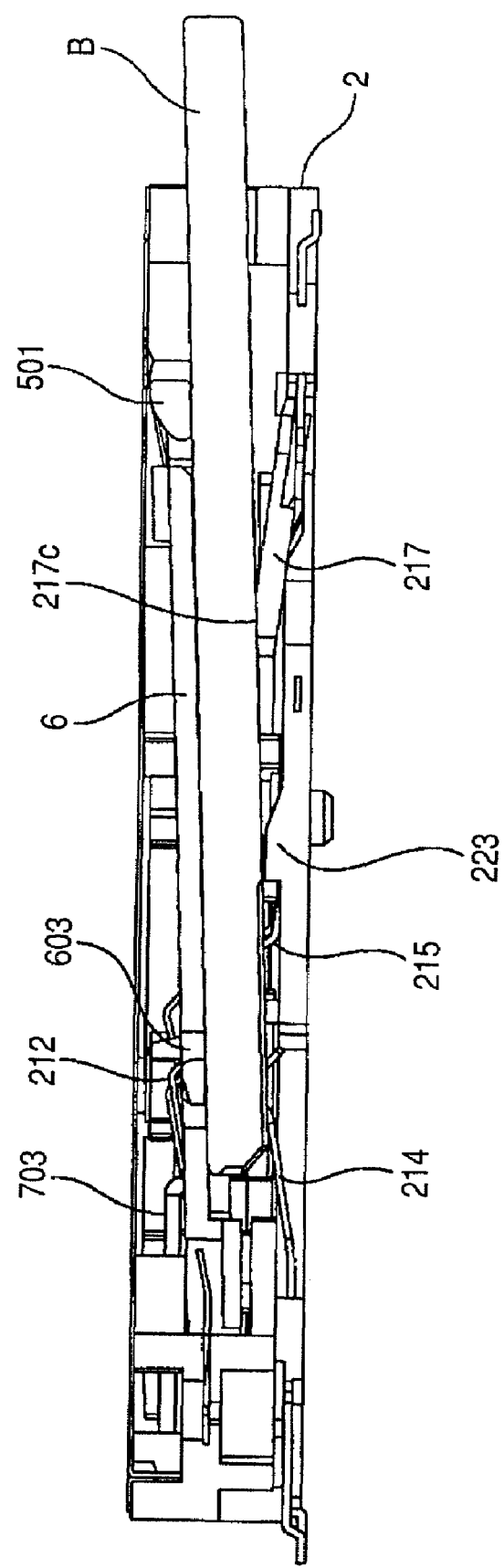
FIG. 31 is a sectional view of the connector in the state shown in FIG. 30.

Next, the operation when the card B is mounted on the connector 1 according to this embodiment will be described. FIG. 27 is a front view of the connector 1 according to this embodiment, showing a case where the card B is inserted into the connector 1. FIG. 28 is a perspective view of the connector 1 according to this embodiment, showing a case where the card B is inserted into the connector 1. FIG. 29 is a sectional view of the connector 1 in the state shown in FIG. 28. FIG. 30 is a perspective view of the connector 1 according to this embodiment, showing a case where the card B is mounted on the connector 1. FIG. 31 is a sectional view of the connector 1 in the state shown in FIG. 30. Before the card B is inserted, the connector 1 is set in the state shown in FIGS. 2 to 4.

As shown in FIG. 27, when the card B is mounted on the connector 1 according to this embodiment, the card B is pushed into the connector 1 in a state where the top surface of the card B is fitted in the notch portion 501*b* provided in the shutter member 501. In this case, the leading end of the card B does not abut on the abutting surface 502*c* of the actuator member 502 and the shutter member 501, different from the case where the card A is inserted. Therefore, the actuator member 502 and the shutter member 501 are not rotated. Further, when the card B is inserted, the left side surface of the card B is abutted on the end of the first guide portion 206 disposed in the left side such that the card B can be easily fitted in the notch portion 501*b*.

The end of the first guide portion 206 disposed on the left side of the inserted card B composes the first side-surface guide portion which guides the side surface of the card B, and the right end of the notch portion 501*b* of the shutter member 501 composes the second side-surface guide portion which guides the side surface of the card B. Since the first and second guide portions guide the side surface of the card B, the contact pad of the card B can be reliably connected to the contacts 214 and 215 for the card B, without deviating from the side direction.

When the card B is pushed in such a manner, the card B advances on the lower side of the partition plate 6 toward the rear side of the connector 1, as shown in FIGS. 28 and 29. In this case, the partition plate 6 moves slightly upward so as to slightly push up the contacts 212 for the card A in the rear-side portion of the opening portion 603. In this case, the leading end of the contacts 212 for the card A are housed in the opening portions 603 of the partition plate 6. As the contacts for the card A are housed in the opening portions 603, the leading ends of the contacts 212 for the card A are prevented from being damaged.

As shown in FIG. 28, the right leading end of the card B abuts on the second abutting surface 705 of the sliding member 701 in a position of the lower side of the partition plate 6, and the convex portion 222*a* of the locking piece 222 provided on the lower side of the sliding member 701 is engaged with the concave portion formed on the bottom surface of the card B. As the convex portion 222*a* is engaged with the concave portion of the card B, the sliding member 701 and the card B move together afterwards. Further, when the leading end of the card B abuts on the second abutting surface 705, the front-side end of the locking member 703 is disposed in the vicinity of the rear end of the linear guide groove 717 of the guide groove 711.

As shown in FIG. 29, when the card B is inserted, the top surface of the card B is guided by the bottom surface of the notch portion 501*b* provided in the shutter member 501 and the bottom surface of the partition plate 6, and the bottom surface of the card B is guided by the support surface 217*c* of the protection plate 217 provided in the housing 2. Further, when the bottom surface of the card B is pushed downward, the guide piece 223 provided in the housing 2 guides the bottom surface of the card B. The positional relationship among them is where the leading end of the card B is supported in a state where it is inclined slightly downward. Therefore, the card B is pushed into the connector 1 in a state where the leading end of the card B is inclined downward.

When the card B is further pushed from the state shown in FIGS. 28 and 29, the contacts 214 and 215 for the card B enter under the bottom surface of the card B so as to come in contact with the contact pad formed on the bottom surface of the leading end of the card B, as shown in FIGS. 30 and 31. At this time, since a biasing force of the biasing piece 302 of the cover member 3 is applied to the card B through the partition plate 6, it is possible to increase the contact pressure between the contact pad of the card B and the contacts 214 and 215 for the card B. FIGS. 30 and 31 show a state where the card B is pushed to the rearmost position of the connector 1 and the hand is separated from the card B. In this state, the front-side end of the locking member 703 is locked to the locking member 715. Even when the card B is mounted in such a manner, the card B is held in a state where the leading end thereof is inclined downward, similar to the case where the card B is inserted. Even in a state where the card B is held in such a manner, the top surface of the card B is guided by the bottom surface of the notch portion 501*b* of the shutter member 501 and the bottom surface of the partition plate 6 such that the connection stability between the contact pad of the card B and the contacts 214 and 215 for the card B is secured.

Figure 32:
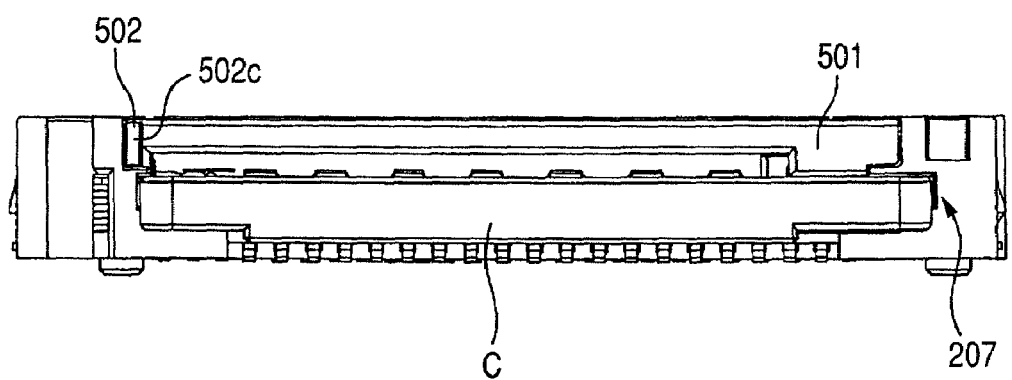
FIG. 32 is a front view of the connector according to this embodiment, showing a case where a card C is inserted into the connector.
Figure 33:
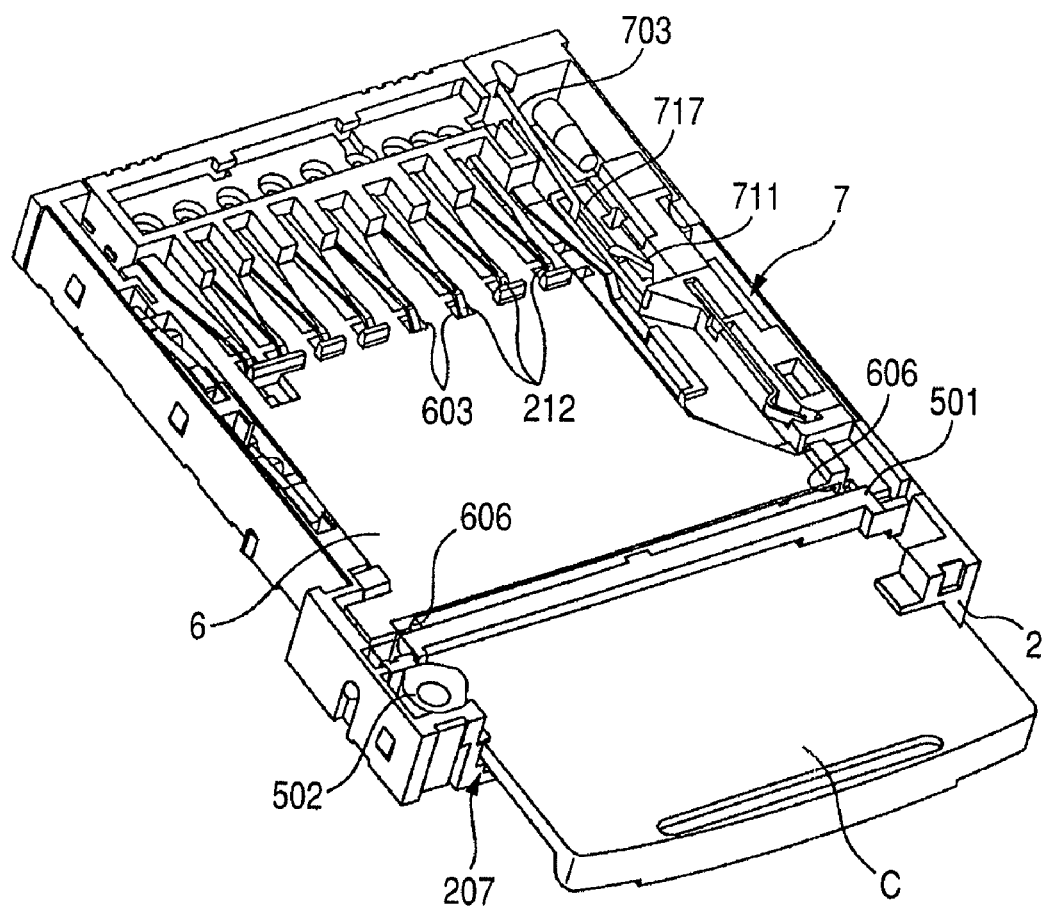
FIG. 33 is a perspective view of the connector according to this embodiment, showing a case where the card C is inserted into the connector.
Figure 34:
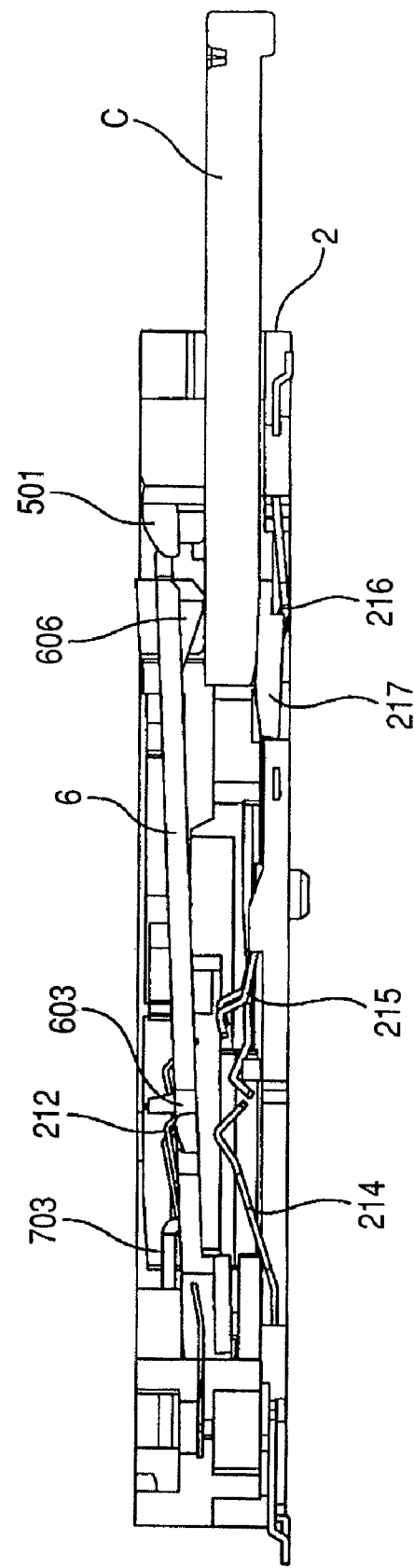
FIG. 34 is a sectional view of the connector in the state shown in FIG. 33.
Figure 35:
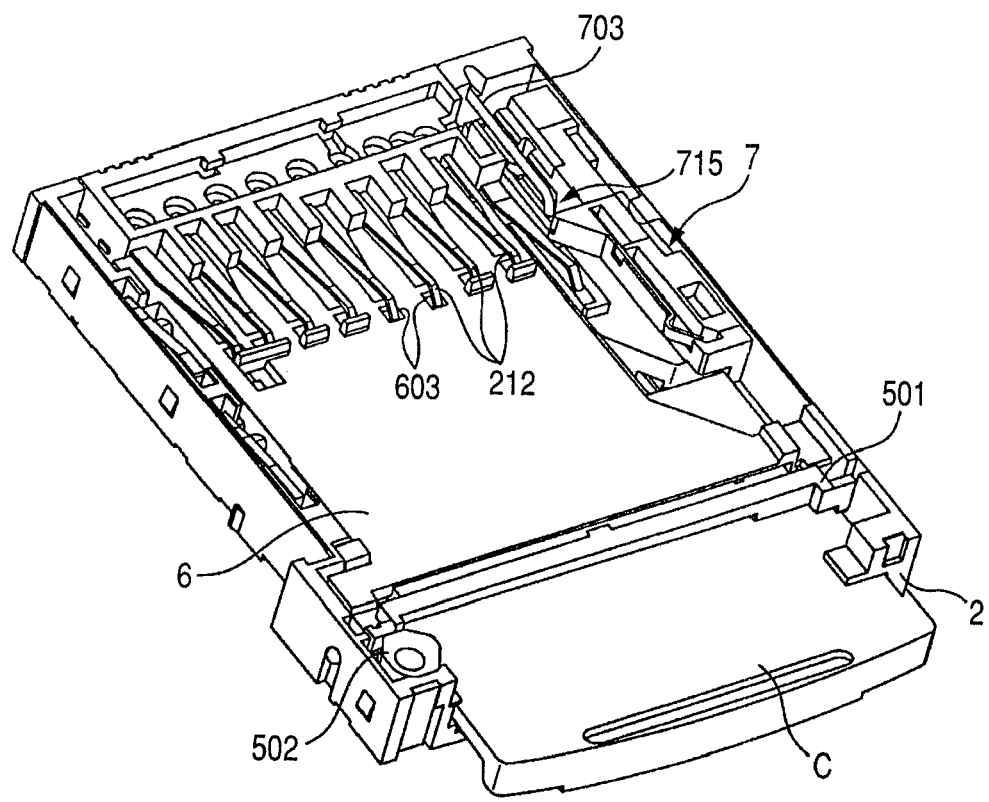
FIG. 35 is a perspective view of the connector according to this embodiment, showing a case where the card C is mounted on the connector.
Figure 36:
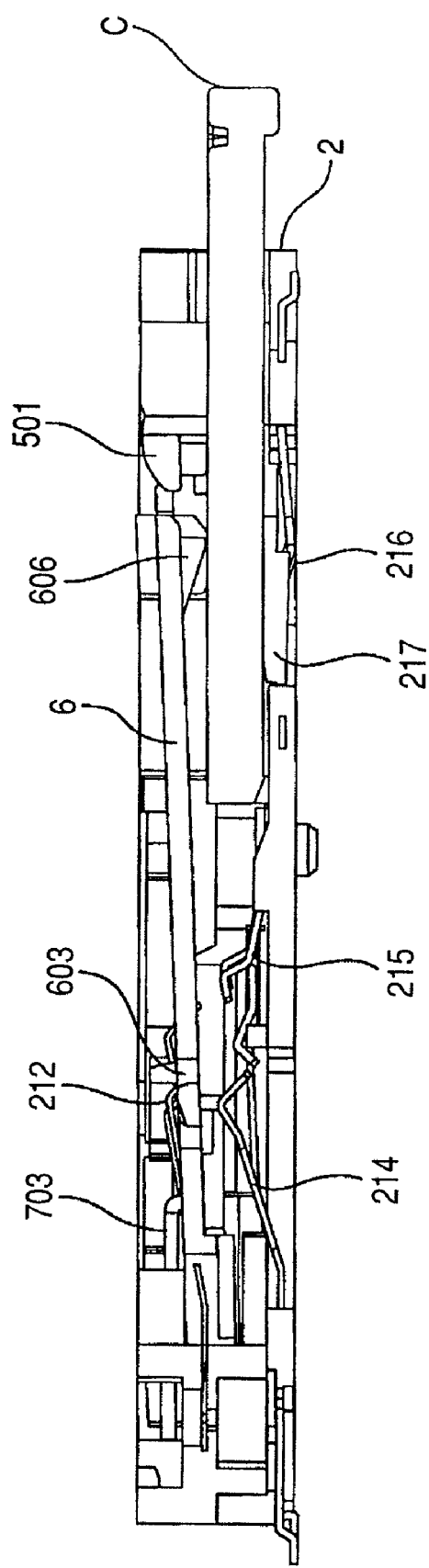
FIG. 36 is a sectional view of the connector in the state shown in FIG. 35.

Next, the operation when the card C is mounted on the connector 1 according to this embodiment will be described. FIG. 32 is a front view of the connector 1 according to this embodiment, showing a case where the card C is inserted into the connector 1. FIG. 33 is a perspective view of the connector 1 according to this embodiment, showing a case where the card C is inserted into the connector 1. FIG. 34 is a sectional view of the connector 1 in the state shown in FIG. 33. FIG. 35 is a perspective view of the connector 1 according to this embodiment, showing a case where the card C is mounted on the connector 1. FIG. 36 is a sectional view of the connector 1 in the state shown in FIG. 35. Before the card C is inserted, the connector 1 is set in the state shown in FIGS. 2 to 4.

As shown in FIG. 32, when the card C is mounted on the connector 1 according to this embodiment, the card C is pushed into the connector 1 in a state where the side and bottom surfaces of the card C are fitted in the second guide portion 207 provided in the housing 2. In this case, the leading end of the card C does not abut on the abutting surface 502*c* of the actuator member 502 and the shutter member 501, different from the case where the card A is inserted. Therefore, the actuator member 502 and the shutter member 501 are not rotated.

When the card C is pushed into the connector 1, the leading end of the card C enters under the pair of projecting pieces 606 provided on the partition plate 6 so as to lift the partition plate 6, as shown in FIG. 33. Then, the leading end of the card C advances on the lower side of the partition plate 6 toward the rear side of the connector 1. In this case, the partition plate 6 moves slightly upward so as to slightly push up the contacts 212 for the card A in the rear side portion of the opening portions 603, similar to the case where the card B is inserted. At this time, the leading ends of the contacts 212 for the card A are housed in the opening portions 603 of the partition plate 6. As the contacts for the card A are housed in the opening portion 603, the leading ends of the contacts 212 for the card A are prevented from being damaged, similar to the case where the card B is inserted.

Further, the bottom surface of the leading end of the card C comes in contact with the protection plate 217 provided in the housing 2 so as to slightly push down the rear end of the protection plate 217 against the biasing force of the support piece 221 which supports the protection plate 217 from the lower side. Accordingly, the contacts 216 for the card C approach the card C inside the groove portion 218 formed in the protection plate 217.

Further, the right leading end of the card C abuts on the third abutting portion 706 of the sliding member 701 in a position of the lower side of the partition plate 6. Further, when the leading end of the card C abuts the third abutting portion 706, the front-side end of the locking member 703 is disposed in the vicinity of the rear end of the linear guide groove 717 of the guide groove 711.

When the card C is further pushed from the state shown in FIGS. 33 and 34, the bottom surface of the card C further pushes down the protection plate 217, as shown in FIGS. 35 and 36. Accordingly, the contacts 216 for the card C are exposed from the groove portion 218 of the protection plate 217. Then, the exposed contacts 216 for the card C enter under the bottom surface of the card C so as to come in contact with the contact pad formed on the bottom surface of the leading end of the card C. At this time, since the biasing force of the biasing piece 302 of the cover member 3 is applied to the card C through the projecting piece 606 of the partition plate 6, it is possible to increase the contact pressure between the contact pad of the card C and the contacts 216 for the card C. FIGS. 35 and 36 show a state where the card C is pushed to the rearmost position of the connector 1 and the hand is separated from the card C. In this state, the front-side end of the locking member 703 is locked to the locking portion 715.

In the connector 1 according to this embodiment, the first bottom-surface guide portion, which guides the bottom surface of the card B during the insertion, is formed in the housing 2, and the second bottom-surface guide portion, which is disposed in a position toward the insertion port 4 and on the upper side from the first bottom-surface guide portion and guides the bottom surface of the card B during the insertion, is formed in the protection plate 217. In a state where the leading end of the card B is inclined more downward than the rear end, the card B is inserted. Since the card B is inserted in such a state where the leading end of the card B is inclined more downward than the rear end, a space can be formed on the lower side of the rear end of the card B. As the contacts 216 for the card C are disposed in the space, a reduction in height of the connector can be achieved. Further, the card B can be mounted without coming in contact with the contacts for the card C.

It should be understood by those skilled in the art that various modifications, combinations, sub-combinations and alternations may occur depending on design requirements and other factors insofar as they are within the scope of the appended claims of the equivalents thereof.

The invention claimed is:

1. A card connector for a card, comprising:
   a housing having a card mounting space where at least first and second cards can be selectively mounted;
   an insertion port for the cards formed at one end of the housing;
   a first contact connected to a contact portion of the first card;
   a second contact disposed toward the insertion port from the first contact so as to be connected to a contact portion of the second card; and
   a protection plate protecting the second contact from contact with the first card,
   wherein a first bottom-surface guide portion guiding the bottom surface of the first card during the insertion of the first card is formed in the housing, and a second bottom-surface guide portion disposed in a position toward the insertion port and on the upper side from the first bottom-surface guide portion to guide the bottom surface of the first card during the insertion of the first card is formed in the protection plate such that the first card is inserted in a state where the leading end of the first card is inclined more downward than the rear end thereof.

2. The card connector according to claim 1, further comprising:
   a card guide member guiding the top surface of the first card during the insertion,
   wherein a first side-surface guide portion guiding one side surface of the first card during the insertion is formed in the housing, and a second side-surface guide portion guiding the other side surface of the first card during the insertion is formed on the card guide member.

3. The card connector according to claim 2, further comprising:
   a partition plate that partitions the card mounting space,
   wherein a first top-surface guide portion guiding the top surface of the first card during the insertion is formed on the card guide member, and a second top-surface guide portion guiding the top surface of the first card during the insertion is formed on the partition plate.

4. The card connector according to claim 3,
   wherein an abutting portion abutting on the first card when the first card is inserted into any space other than the card mounting space corresponding to the first card is formed in a position toward the insertion port from the second contact in the partition plate.

5. The card connector according to claim 3, further comprising:
   a biasing member that biases the partition plate,
   wherein the first card receives a biasing force of the biasing member through the partition plate so as to come in contact with the first contact.

6. The card connector according to claim 5,
   wherein the partition plate has a transmission portion formed thereon, the transmission portion transmitting the biasing force of the biasing member to the second card.

* * * * *